US008321672B2

(12) United States Patent
Asano

(10) Patent No.: US 8,321,672 B2
(45) Date of Patent: Nov. 27, 2012

(54) AUTHENTICATION SYSTEM, INFORMATION PROCESSING APPARATUS AND METHOD, PROGRAM, AND RECORDING MEDIUM

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1284 days.

(21) Appl. No.: 12/014,254

(22) Filed: Jan. 15, 2008

(65) Prior Publication Data
US 2008/0209545 A1 Aug. 28, 2008

(30) Foreign Application Priority Data
Jan. 24, 2007 (JP) ................................ P2007-013833

(51) Int. Cl.
H04L 9/32 (2006.01)

(52) U.S. Cl. ............ 713/169; 713/156; 713/168; 726/2; 726/19

(58) Field of Classification Search .................. None
See application file for complete search history.

(56) References Cited

U.S. PATENT DOCUMENTS

| 6,819,219 | B1* | 11/2004 | Bolle et al. ................... 340/5.52 |
| 6,886,095 | B1* | 4/2005 | Hind et al. ..................... 713/168 |
| 7,814,557 | B2* | 10/2010 | Sakamura et al. ............. 726/27 |
| 2001/0044894 | A1* | 11/2001 | Saito et al. ..................... 713/156 |
| 2005/0055557 | A1* | 3/2005 | Yamada et al. ............... 713/186 |
| 2005/0240778 | A1* | 10/2005 | Saito ............................. 713/186 |
| 2005/0253683 | A1* | 11/2005 | Lowe ........................... 340/5.53 |
| 2006/0050931 | A1* | 3/2006 | Oka .............................. 382/115 |
| 2006/0078177 | A1* | 4/2006 | Niinuma et al. ............. 382/124 |
| 2006/0170530 | A1* | 8/2006 | Nwosu et al. ................ 340/5.53 |
| 2006/0239421 | A1* | 10/2006 | Ishibashi et al. ........... 379/88.13 |
| 2007/0040017 | A1* | 2/2007 | Kozlay .......................... 235/380 |
| 2007/0057763 | A1* | 3/2007 | Blattner et al. .............. 340/5.52 |
| 2007/0076925 | A1* | 4/2007 | Mimura et al. .............. 382/124 |
| 2008/0077796 | A1* | 3/2008 | Lund et al. .................... 713/173 |
| 2010/0174907 | A1* | 7/2010 | Semple et al. ............... 713/169 |

FOREIGN PATENT DOCUMENTS
JP 2002-222169 8/2002
(Continued)

OTHER PUBLICATIONS

Leniski et al., "Securing the Biometric Model," IEEE, 2003, pp. 444-450.*
Isobe et al., "Development of Personal Authentication System Using Fingerprint with Digital Signature Technologies," IEEE, 2001, pp. 1-9.*
Al-Muhtadi et al., "Wearable Security Service," IEEE, 2001, pp. 266-272.*

(Continued)

Primary Examiner — Luu Pham
(74) Attorney, Agent, or Firm — Finnegan, Henderson, Farabow, Garrett & Dunner, L.L.P.

(57) ABSTRACT

An authentication system includes a mobile device carried by a user and a sensor sensing the user's biometric information. The mobile device includes a template storage unit storing the user's biometric information as a template, a first mutual authentication unit performing mutual authentication with the sensor via the user's body, and a template transmitter transmitting the stored template to the sensor via the user's body when the sensor is verified as valid. The sensor includes a second mutual authentication unit performing mutual authentication with the mobile device via the user's body, a sensing unit sensing the user's biometric information, a degree-of-match determining unit determining whether the biometric information matches the template, and a control-signal output unit outputting a preset control signal when the mobile device is verified as valid and when the biometric information and the template are determined to match each other.

25 Claims, 10 Drawing Sheets

FOREIGN PATENT DOCUMENTS

| | | |
|---|---|---|
| JP | 2002-278942 | 9/2002 |
| JP | 2003-058509 | 2/2003 |
| JP | 2003-060635 | 2/2003 |
| JP | 2004-110433 | 4/2004 |
| JP | 2004-110433 | 8/2004 |
| JP | 2006-268614 | 10/2006 |

OTHER PUBLICATIONS

Moon et al., "Mutual Authentication Using Fuzzy Fingerprint Vault," IEEE, 2006, pp. 878-882.*

Benavente et al., "Authentication Services and Biometrics: Network Security Issues," IEEE, 2005, pp. 1-4.*

* cited by examiner

FIG. 5

| DEVICE ID | 1234 | |
|---|---|---|
| KEY | SECRET KEY KSd | PUBLIC KEY KPd |
| ATTRIBUTE | PERMITTED SECTION | ... |
| | A, B, C | ... |
| CERTIFICATE | DEVICE ID "1234", PUBLIC KEY KPd, ATTRIBUTE, AND SIGNATURE | |
| TEMPLATE | BIOMETRIC INFORMATION OF USER | |
| PUBLIC KEY OF CA | PUBLIC KEY KPc | |

FIG. 6

| DEVICE ID | 9876 | |
|---|---|---|
| KEY | SECRET KEY KSr | PUBLIC KEY KPr |
| ATTRIBUTE | DEVICE SECTION | ... |
| | B | ... |
| CERTIFICATE | DEVICE ID "9876", PUBLIC KEY KPr, AND SIGNATURE | |
| PUBLIC KEY OF CA | PUBLIC KEY KPc | |
| CRL | LIST OF REVOKED CERTIFICATES | |

AUTHENTICATION SYSTEM, INFORMATION PROCESSING APPARATUS AND METHOD, PROGRAM, AND RECORDING MEDIUM

CROSS REFERENCES TO RELATED APPLICATIONS

The present invention contains subject matter related to Japanese Patent Application JP 2007-013833 filed in the Japanese Patent Office on Jan. 24, 2007, the entire contents of which are incorporated herein by reference.

BACKGROUND OF THE INVENTION

1. Field of the Invention

The present invention relates to authentication systems, information processing apparatuses and methods, programs, and recording media, and more particularly, to an authentication system, an information processing apparatus and method, a program, and a recording medium for realizing reliable user authentication at low cost.

2. Description of the Related Art

In recent years, authentication systems based on finger vein patterns, palm vein patterns, or the like have been widely used. At the same time, communication technology has been greatly developed in recent years. For example, a communication technique using a human body as a communication medium has been proposed (e.g., see Japanese Unexamined Patent Application Publication No. 2006-268614).

Japanese Unexamined Patent Application Publication No. 2006-268614 discloses a user authentication technique adoptable on, for example, automatic teller machines (ATMs) at banks. Communication is performed between a mobile device carried by a user and an ATM via the body of the user as a communication medium, and the user's account number stored in the mobile device is transmitted to the ATM. The ATM transmits the received account number and biometric information sensed from the user to a server via a network. The server performs biometric authentication by matching the received biometric information against pre-stored registered biometric information.

SUMMARY OF THE INVENTION

Since the technique disclosed in Japanese Unexamined Patent Application Publication No. 2006-268614 involves communication between the ATM and the server, a communication path such as a network is necessary. It is relatively easy to provide a communication path between an ATM at a bank and the server. However, for example, if there is a request for performing user authentication in place of an engine key for an automobile, it is generally difficult to provide a communication path between the automobile and the server.

Besides the engine key for the automobile, there are requests for performing user authentication in place of, for example, keys for doors to enter buildings and houses. There are a growing number of requests for performing user authentication at places where it is difficult to provide a communication path to the server.

It is desirable to realize reliable user authentication at low cost.

According to an embodiment of the present invention, there is provided an authentication system including a mobile device carried by a user and a sensor configured to sense biometric information of the user. The mobile device and the sensor communicate with each other via a human body as a communication medium. The mobile device includes template storage means for storing the biometric information of the user as a template, first mutual authentication means for performing mutual authentication with the sensor by performing communication via the body of the user as a communication medium, and template transmitting means for transmitting the template stored in the template storage means to the sensor via the body of the user in a case where the sensor is verified as a valid sensor based on a mutual authentication result obtained by the first mutual authentication means. The sensor includes second mutual authentication means for performing mutual authentication with the mobile device by performing communication via the body of the user as the communication medium, sensing means for sensing the biometric information of the user, degree-of-match determining means for determining whether the biometric information of the user sensed by the sensing means matches the template transmitted from the mobile device via the body of the user based on information obtained by comparing the biometric information with the template, and control-signal output means for outputting a preset control signal in a case where the mobile device is verified as a valid mobile device based on a mutual authentication result obtained by the second mutual authentication means and in a case where the degree-of-match determining means determines that the biometric information and the template match each other.

According to the foregoing embodiment of the present invention, the mobile device stores the biometric information of the user as a template, performs mutual authentication with the sensor by performing communication via the body of the user as a communication medium, and transmits the stored template to the sensor via the body of the user in a case where the sensor is verified as a valid sensor based on a mutual authentication result. The sensor performs mutual authentication with the mobile device by performing communication via the body of the user as the communication medium, senses the biometric information of the user, determines whether the sensed biometric information of the user matches the template transmitted from the mobile device via the body of the user based on information obtained by comparing the biometric information with the template, and outputs a preset control signal in a case where the mobile device is verified as a valid mobile device based on a mutual authentication result and in a case where it is determined that the biometric information and the template match each other.

According to another embodiment of the present invention, there is provided an information processing apparatus that is carried by a user and that performs communication via the body of the user as a communication medium with a sensor that senses biometric information of the user, including template storage means for storing the biometric information of the user as a template, mutual authentication means for performing mutual authentication with the sensor by performing communication via the body of the user as the communication medium, and template transmitting means for transmitting the template stored in the template storage means to the sensor via the body of the user in a case where the sensor is verified as a valid sensor based on a mutual authentication result obtained by the mutual authentication means.

The mutual authentication performed by the mutual authentication means may be based on public-key cryptography, and a cryptographic key of the public-key cryptography may be managed based on a public key infrastructure.

According to another embodiment of the present invention, there is provided an information processing method for an information processing apparatus that is carried by a user and that performs communication via the body of the user as a communication medium with a sensor that senses biometric information of the user, including the steps of performing mutual authentication with the sensor by performing communication via the body of the user as the communication medium, and transmitting a template that is pre-stored biometric information of the user to the sensor via the body of the user in a case where the sensor is verified as a valid sensor based on a mutual authentication result.

According to another embodiment of the present invention, there is provided a computer-readable program that allows an information processing apparatus that is carried by a user and that performs communication via the body of the user as a communication medium with a sensor that senses biometric information of the user to perform information processing, the information processing including the steps of controlling performing mutual authentication with the sensor by performing communication via the body of the user as the communication medium, and controlling transmitting a template that is pre-stored biometric information of the user to the sensor via the body of the user in a case where the sensor is verified as a valid sensor based on a mutual authentication result.

According to the foregoing embodiments of the present invention, mutual authentication is performed with the sensor by performing communication via the body of the user as a communication medium. A template that is pre-stored biometric information of the user is transmitted to the sensor via the body of the user in a case where the sensor is verified as a valid sensor based on a mutual authentication result.

According to another embodiment of the present invention, there is provided an information processing apparatus that is carried by a user and that performs communication via the body of the user as a communication medium with a sensor that senses biometric information of the user, including template storage means for storing the biometric information of the user as a template, mutual authentication means for performing mutual authentication with the sensor by performing communication via the body of the user as the communication medium, degree-of-match determining means for determining whether the biometric information of the user transmitted from the sensor via the body of the user matches the template based on information obtained by comparing the biometric information with the template, and determination-result transmitting means for transmitting information indicating a determination result obtained by the degree-of-match determining means to the sensor via the body of the user.

The mutual authentication performed by the mutual authentication means may be based on public-key cryptography, and a cryptographic key of the public-key cryptography may be managed based on a public key infrastructure.

According to another embodiment of the present invention, there is provided an information processing method for an information processing apparatus that is carried by a user and that performs communication via the body of the user as a communication medium with a sensor that senses biometric information of the user, including the steps of performing mutual authentication with the sensor by performing communication via the body of the user as the communication medium, determining whether the biometric information of the user transmitted from the sensor via the body of the user matches a template that is pre-stored biometric information of the user based on information obtained by comparing the biometric information with the template, and transmitting information indicating a determination result to the sensor via the body of the user.

According to another embodiment of the present invention, there is provided a computer-readable program that allows an information processing apparatus that is carried by a user and that performs communication via the body of the user as a communication medium with a sensor that senses biometric information of the user to perform information processing, the information processing including the steps of controlling performing mutual authentication with the sensor by performing communication via the body of the user as the communication medium, controlling determining whether the biometric information of the user transmitted from the sensor via the body of the user matches a template that is pre-stored biometric information of the user based on information obtained by comparing the biometric information with the template, and controlling transmitting information indicating a determination result to the sensor via the body of the user.

According to the foregoing embodiments of the present invention, mutual authentication is performed with the sensor by performing communication via the body of the user as a communication medium. Whether the biometric information of the user transmitted from the sensor via the body of the user matches a template that is pre-stored biometric information of the user is determined based on information obtained by comparing the biometric information with the template. Information indicating a determination result is transmitted to the sensor via the body of the user.

According to another embodiment of the present invention, there is provided an information processing apparatus for performing communication with a mobile device that is carried by a user and that stores in advance biometric information of the user as a template via the body of the user as a communication medium, including mutual authentication means for performing mutual authentication with the mobile device by performing communication via the body of the user as the communication medium, sensing means for sensing the biometric information of the user, degree-of-match determining means for determining whether the biometric information of the user sensed by the sensing means matches the template transmitted from the mobile device via the body of the user based on information obtained by comparing the biometric information with the template, and control-signal output means for outputting a preset control signal in a case where the mobile device is verified as a valid mobile device based on a mutual authentication result obtained by the mutual authentication means and in a case where the degree-of-match determining means determines that the biometric information and the template match each other.

The mutual authentication performed by the mutual authentication means may be based on public-key cryptography, and a cryptographic key of the public-key cryptography may be managed based on a public key infrastructure.

According to another embodiment of the present invention, there is provided an information processing method for an information processing apparatus for performing communication with a mobile device that is carried by a user and that stores in advance biometric information of the user as a template via the body of the user as a communication medium, including the steps of performing mutual authentication with the mobile device by performing communication via the body of the user as the communication medium, sensing the biometric information of the user, determining whether the sensed biometric information of the user matches the template transmitted from the mobile device via the body of the user based on information obtained by comparing the biometric information with the template, and outputting a preset control signal in a case where the mobile device is verified as a valid mobile device based on a mutual authentication result and in a case where it is determined that the biometric information and the template match each other.

According to another embodiment of the present invention, there is provided a computer-readable program that allows an information processing apparatus for performing communication with a mobile device that is carried by a user and that stores in advance biometric information of the user as a template via the body of the user as a communication medium to perform information processing, the information processing including the steps of controlling performing mutual authentication with the mobile device by performing communication via the body of the user as the communication medium, controlling sensing the biometric information of the user, controlling determining whether the sensed biometric information of the user matches the template transmitted from the mobile device via the body of the user based on information obtained by comparing the biometric information with the template, and controlling outputting a preset control signal in a case where the mobile device is verified as a valid mobile device based on a mutual authentication result and in a case where it is determined that the biometric information and the template match each other.

According to the foregoing embodiments of the present invention, mutual authentication is performed with the mobile device by performing communication via the body of the user as a communication medium. The biometric information of the user is sensed. Whether the sensed biometric information of the user matches the template transmitted from the mobile device via the body of the user is determined based on information obtained by comparing the biometric information with the template. A preset control signal is output in a case where the mobile device is verified as a valid mobile device based on a mutual authentication result and in a case where it is determined that the biometric information and the template match each other.

According to another embodiment of the present invention, there is provided an information processing apparatus for performing communication with a mobile device that is carried by a user and that stores in advance biometric information of the user as a template via the body of the user as a communication medium, including mutual authentication means for performing mutual authentication with the mobile device by performing communication via the body of the user as the communication medium, sensing means for sensing the biometric information of the user, biometric-information transmitting means for transmitting the biometric information of the user sensed by the sensing means via the body of the user, and control-signal output means for outputting a preset control signal in a case where the mobile device is verified as a valid mobile device based on a mutual authentication result obtained by the mutual authentication means and in a case where the mobile device, which has received the biometric information of the user transmitted from the biometric-information transmitting means, receives via the body of the user information indicating a determination result that the biometric information and the template are determined to match each other.

The mutual authentication performed by the mutual authentication means may be based on public-key cryptography, and a cryptographic key of the public-key cryptography may be managed based on a public key infrastructure.

According to another embodiment of the present invention, there is provided an information processing method for an information processing apparatus for performing communication with a mobile device that is carried by a user and that stores in advance biometric information of the user as a template via the body of the user as a communication medium, including the steps of performing mutual authentication with the mobile device by performing communication via the body of the user as the communication medium, sensing the biometric information of the user and transmitting the sensed biometric information of the user via the body of the user, and outputting a preset control signal in a case where the mobile device is verified as a valid mobile device based on a mutual authentication result and in a case where the mobile device, which has received the transmitted biometric information of the user, receives via the body of the user information indicating a determination result that the biometric information and the template are determined to match each other.

According to another embodiment of the present invention, there is provided a computer-readable program that allows an information processing apparatus for performing communication with a mobile device that is carried by a user and that stores in advance biometric information of the user as a template via the body of the user as a communication medium to perform information processing, the information processing including the steps of controlling performing mutual authentication with the mobile device by performing communication via the body of the user as the communication medium, controlling sensing the biometric information of the user and transmitting the sensed biometric information of the user via the body of the user, and controlling outputting a preset control signal in a case where the mobile device is verified as a valid mobile device based on a mutual authentication result and in a case where the mobile device, which has received the transmitted biometric information of the user, receives via the body of the user information indicating a determination result that the biometric information and the template are determined to match each other.

According to the foregoing embodiments of the present invention, mutual authentication is performed with the mobile device by performing communication via the body of the user as a communication medium. The biometric information of the user is sensed, and the sensed biometric information of the user is transmitted via the body of the user. A preset control signal is output in a case where the mobile device is verified as a valid mobile device based on a mutual authentication result and in a case where the mobile device, which has received the transmitted biometric information of the user, receives via the body of the user information indicating a determination result that the biometric information and the template are determined to match each other.

According to the foregoing embodiments of the present invention, reliable user authentication can be realized at low cost.

BRIEF DESCRIPTION OF THE DRAWINGS

FIG. 5 illustrates exemplary information stored in a memory of the mobile device;

FIG. 6 illustrates exemplary information stored in a memory of the sensor;

DESCRIPTION OF THE PREFERRED EMBODIMENTS

Figure 1:
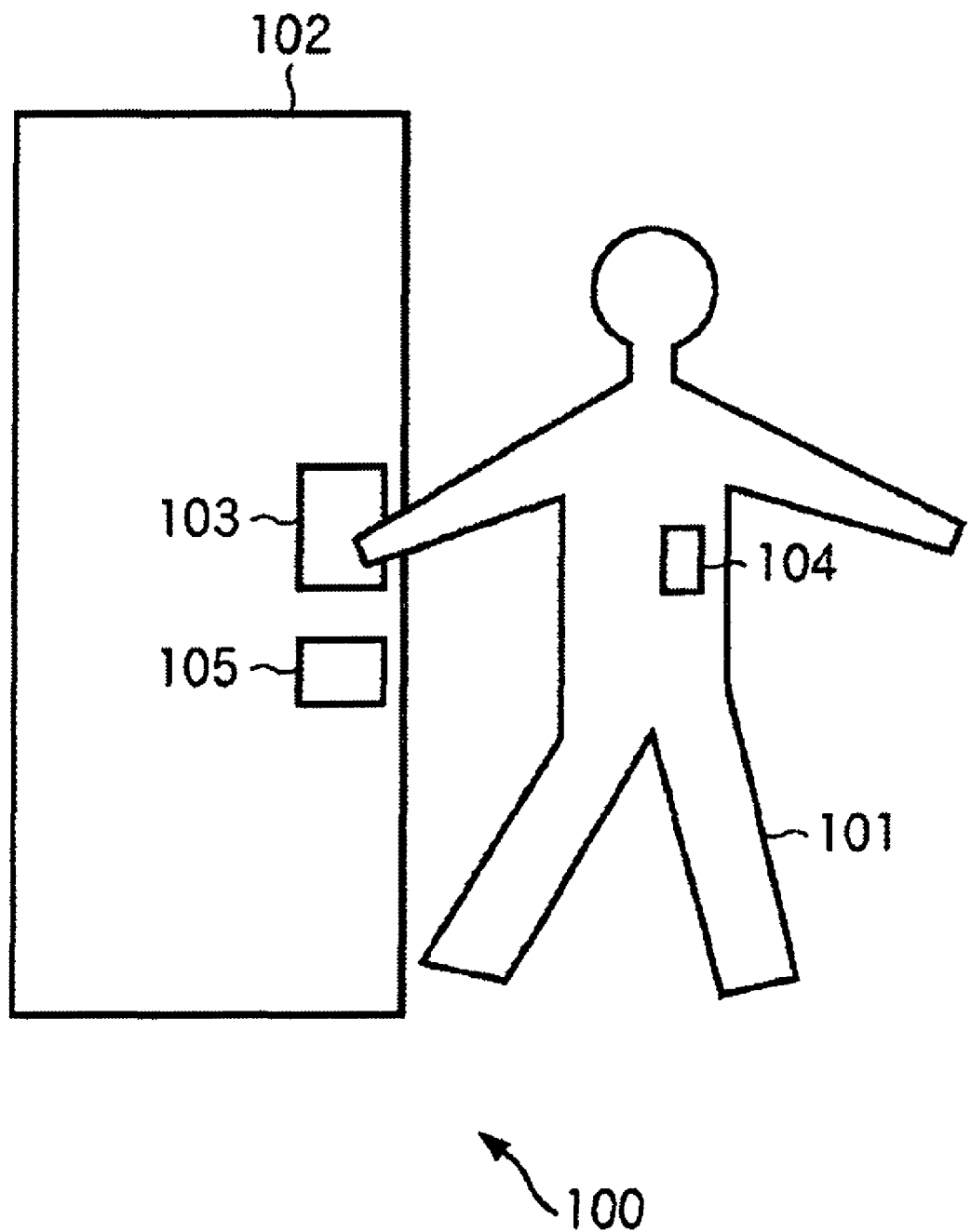
FIG. 1 is a block diagram of an exemplary structure of a door-lock control system according to an embodiment of the present invention.

Before describing embodiments of the present invention, exemplary correspondence between the features of the claims and embodiments described in the specification or shown in the drawings will be described below. This description is intended to assure that embodiments supporting the claimed invention are described in this specification or shown in the drawings. Thus, even if a certain embodiment is described in this specification or shown in the drawings not as corresponding to certain features of the claims, that does not necessarily mean that the embodiment does not correspond to those features of the claims. Conversely, even if an embodiment is described or shown as corresponding to certain features of the claims, that does not necessarily mean that the embodiment does not correspond to other features of the claims.

An authentication system according to an embodiment of the present invention is an authentication system including a mobile device carried by a user, and a sensor configured to sense biometric information of the user, the mobile device and the sensor communicating with each other via a human body as a communication medium. The mobile device includes template storage means (e.g., a memory 201 shown in FIG. 4) for storing the biometric information of the user as a template, first mutual authentication means (e.g., a controller 202 shown in FIG. 4 for performing the processing in steps S11 to S20 of FIG. 7) for performing mutual authentication with the sensor by performing communication via the body of the user as a communication medium, and template transmitting means (e.g., the controller 202 shown in FIG. 4 for performing the processing in step S21 of FIG. 7) for transmitting the template stored in the template storage means to the sensor via the body of the user in a case where the sensor is verified as a valid sensor based on a mutual authentication result obtained by the first mutual authentication means. The sensor includes second mutual authentication means (e.g., a controller 155 shown in FIG. 2 for performing the processing in steps S51 to S60 of FIG. 7) for performing mutual authentication with the mobile device by performing communication via the body of the user as the communication medium, sensing means (e.g., a biometric-information sensing unit 152 shown in FIG. 2) for sensing the biometric information of the user, degree-of-match determining means (e.g., a computing unit 151 shown in FIG. 2 for performing the processing in step S104 of FIG. 8) for determining whether the biometric information of the user sensed by the sensing means matches the template transmitted from they mobile device via the body of the user based on information obtained by comparing the biometric information with the template, and control-signal output means (e.g., the controller 155 shown in FIG. 2 for performing the processing in step S106 of FIG. 8) for outputting a preset control signal in a case where the mobile device is verified as a valid mobile device based on a mutual authentication result obtained by the second mutual authentication means and in a case where the degree-of-match determining means determines that the biometric information and the template match each other.

An information processing apparatus according to another embodiment of the present invention is an information processing apparatus that is carried by a user and that performs communication via the body of the user as a communication medium with a sensor that senses biometric information of the user, including template storage means (e.g., the memory 201 shown in FIG. 4) for storing the biometric information of the user as a template, mutual authentication means (e.g., the controller 202 shown in FIG. 4 for performing the processing in steps S11 to S20 of FIG. 7) for performing mutual authentication with the sensor by performing communication via the body of the user as the communication medium, and template transmitting means (e.g., the controller 202 shown in FIG. 4 for performing the processing in step S21 of FIG. 7) for transmitting the template stored in the template storage means to the sensor via the body of the user in a case where the sensor is verified as a valid sensor based on a mutual authentication result obtained by the mutual authentication means.

Figure 7:
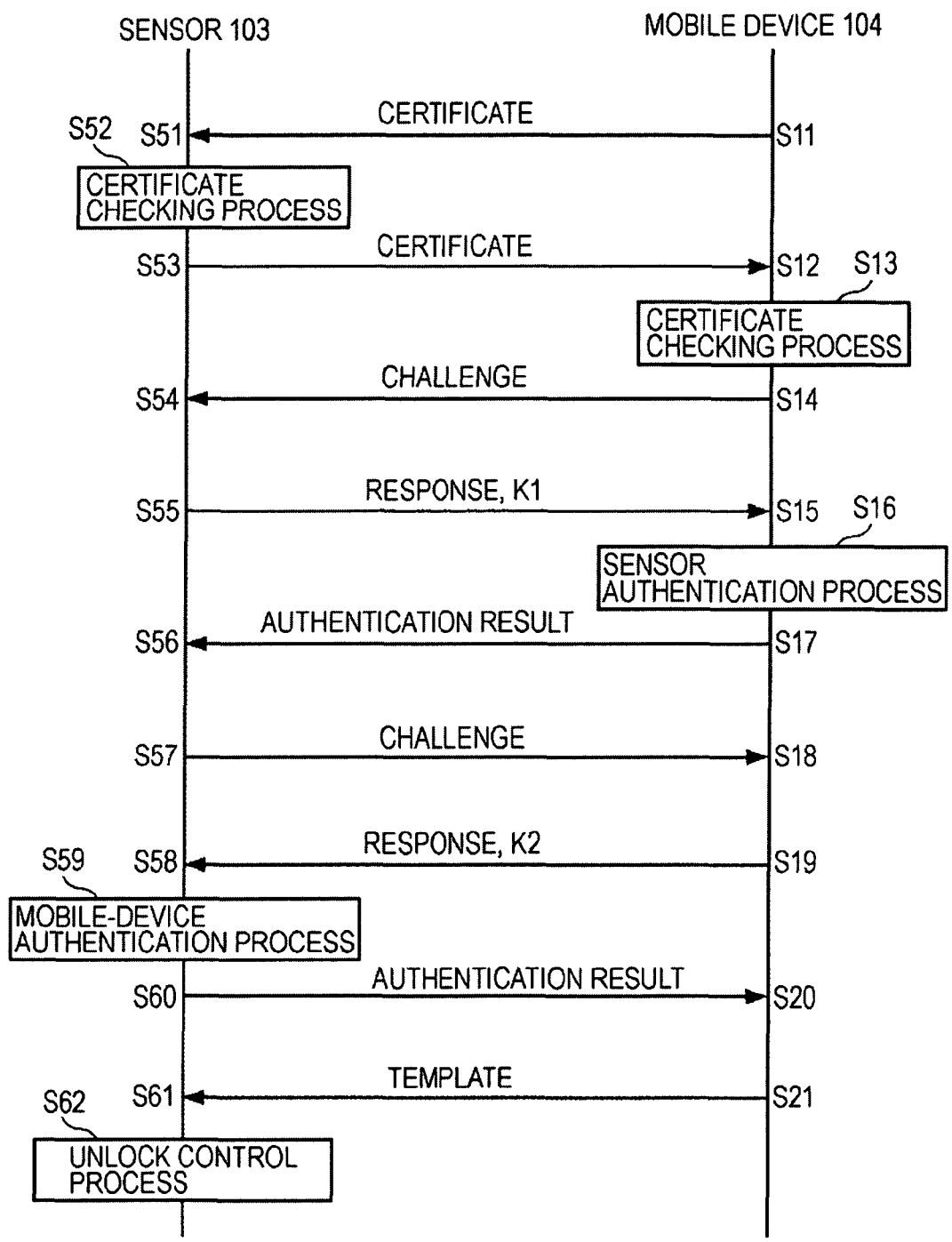
FIG. 7 is an arrow chart for describing an exemplary communication process performed between the mobile device and the sensor.

An information processing method according to another embodiment of the present invention is an information processing method for an information processing apparatus that is carried by a user and that performs communication via the body of the user as a communication medium with a sensor that senses biometric information of the user, including the steps of performing mutual authentication with the sensor by performing communication via the body of the user as the communication medium (e.g., the processing in steps S11 to S20 of FIG. 7), and transmitting a template that is pre-stored biometric information of the user to the sensor via the body of the user in a case where the sensor is verified as a valid sensor based on a mutual authentication result (e.g., the processing in step S21 of FIG. 7).

An information processing apparatus according to another embodiment is an information processing apparatus that is carried by a user and that performs communication via the body of the user as a communication medium with a sensor that senses biometric information of the user, including template storage means (e.g., the memory 201 shown in FIG. 4) for storing the biometric information of the user as a template, mutual authentication means (e.g., the controller 202 shown in FIG. 4 for performing the processing in steps S211 to S220 of FIG. 9) for performing mutual authentication with the sensor by performing communication via the body of the user as the communication medium, degree-of-match determining means (e.g., the controller 202 shown in FIG. 4 for performing the processing in step S222 of FIG. 9) for determining whether the biometric information of the user transmitted from the sensor via the body of the user matches the template based on information obtained by comparing the biometric information with the template, and determination-result transmitting means (e.g., the controller 202 shown in FIG. 4 for performing the processing in step S223 of FIG. 9) for transmitting information indicating a determination result obtained by the degree-of-match determining means to the sensor via the body of the user.

Figure 9:
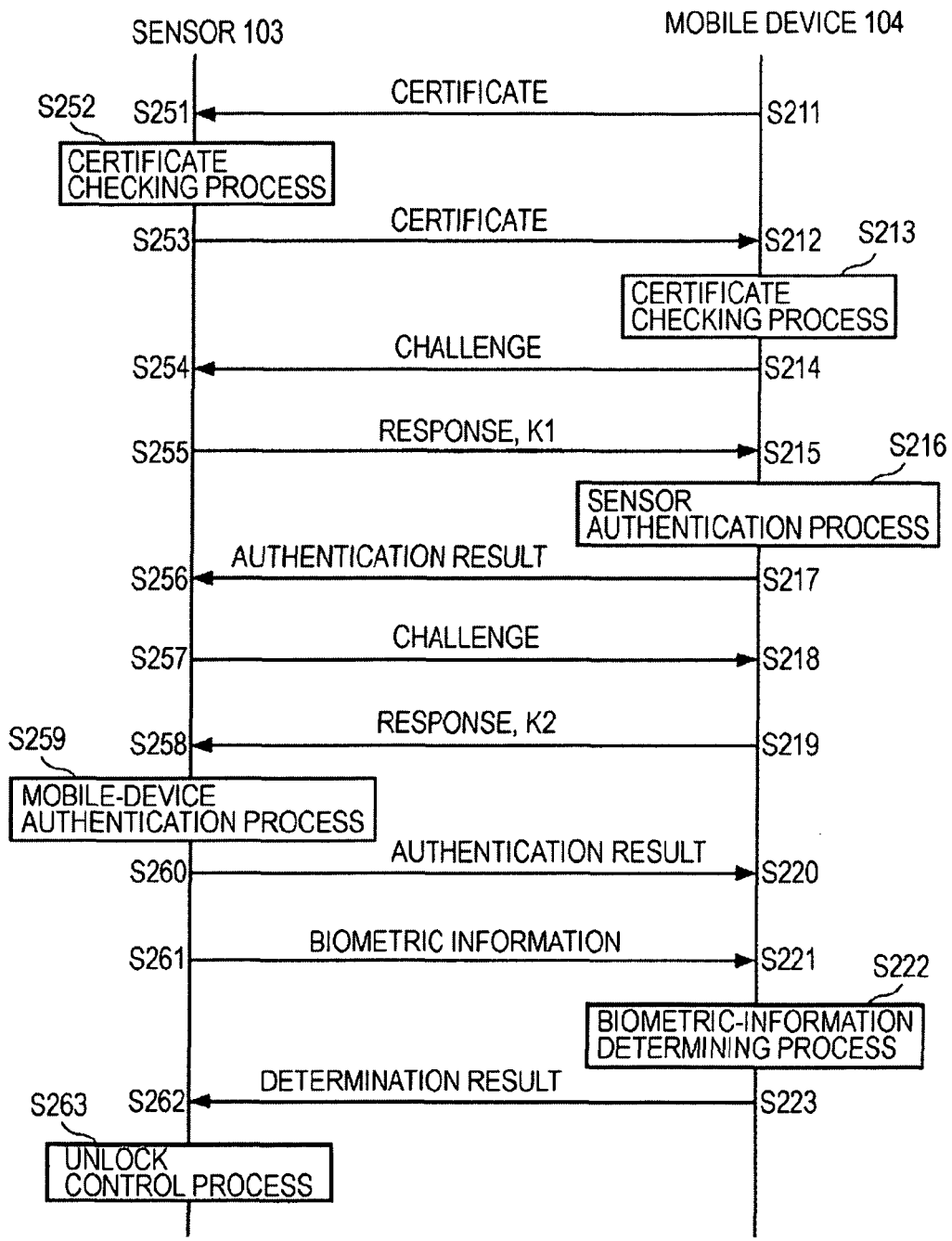
FIG. 9 is an arrow chart for describing another exemplary communication process performed between the mobile device and the sensor.

An information processing method according to another embodiment of the present invention is an information processing method for an information processing apparatus that is carried by a user and that performs communication via the body of the user as a communication medium with a sensor that senses biometric information of the user, including the steps of performing mutual authentication with the sensor by performing communication via the body of the user as the communication medium (e.g., the processing in steps S211 to S220 of FIG. 9), determining whether the biometric information of the user transmitted from the sensor via the body of the user matches a template that is pre-stored biometric information of the user based on information obtained by comparing the biometric information with the template (e.g., the processing in step S222 of FIG. 9), and transmitting information indicating a determination result to the sensor via the body of the user (e.g., the processing in step S223 of FIG. 9).

An information processing apparatus according to another embodiment of the present invention is an information processing apparatus for performing communication with a mobile device that is carried by a user and that stores in advance biometric information of the user as a template via the body of the user as a communication medium, including mutual authentication means (e.g., the controller 155 shown in FIG. 2 for performing the processing in steps S51 to S60 of FIG. 7) for performing mutual authentication with the mobile device by performing communication via the body of the user as the communication medium, sensing means (e.g., the biometric-information sensing unit 152 shown in FIG. 2) for sensing the biometric information of the user, degree-of-match determining means (the computing unit 151 shown in FIG. 2 for performing the processing in step S104 of FIG. 8) for determining whether the biometric information of the user sensed by the sensing means matches the template transmitted from the mobile device via the body of the user based on information obtained by comparing the biometric information with the template, and control-signal output means (e.g., the controller 155 shown in FIG. 2 for performing the processing in step S106 of FIG. 8) for outputting a preset control signal in a case where the mobile device is verified as a valid mobile device based on a mutual authentication result obtained by the mutual authentication means and in a case where the degree-of-match determining means determines that the biometric information and the template match each other.

Figure 8:
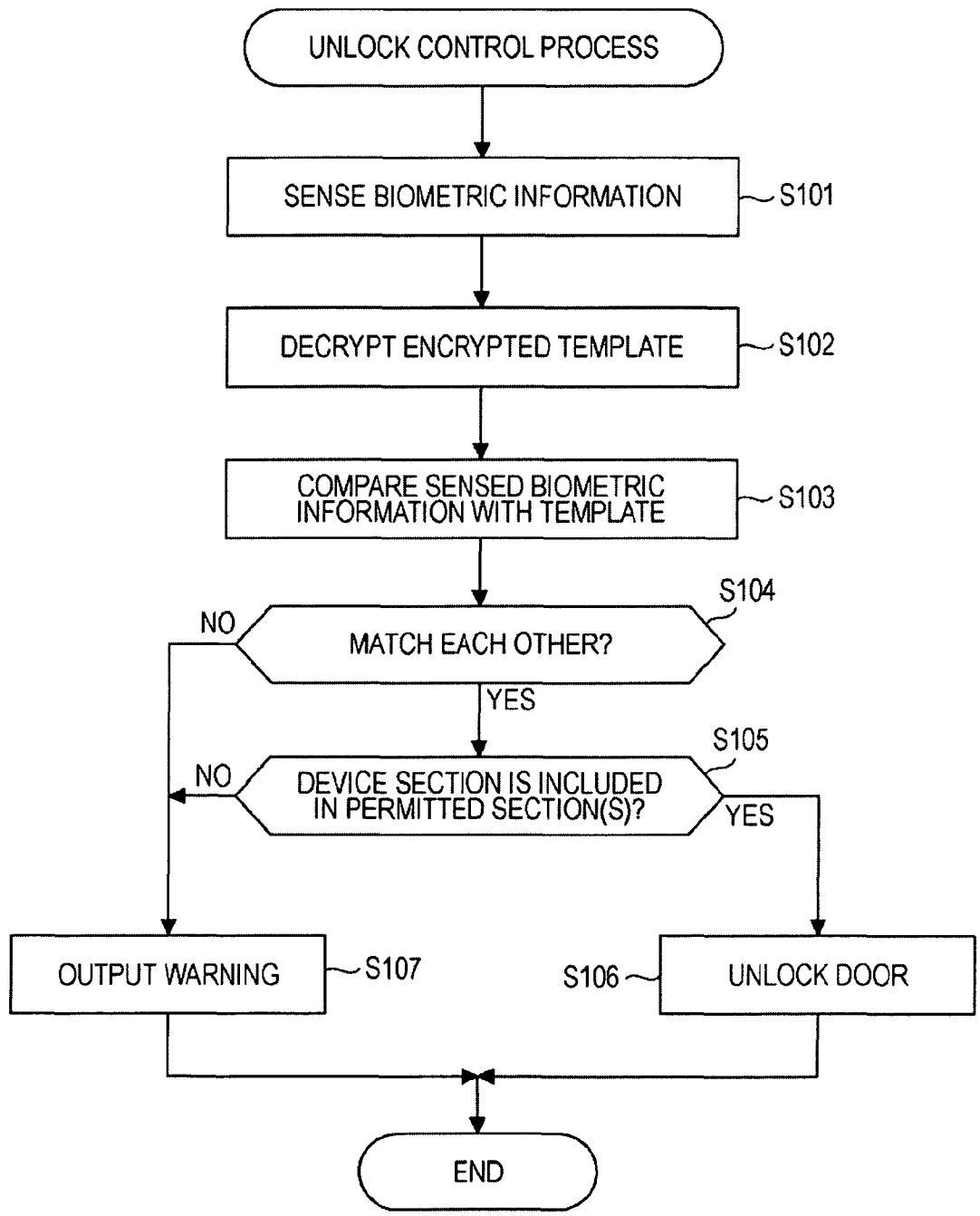
FIG. 8 is a flowchart for describing an exemplary unlock control process shown in FIG. 7.

An information processing method according to another embodiment of the present invention is an information processing method for an information processing apparatus for performing communication with a mobile device that is carried by a user and that stores in advance biometric information of the user as a template via the body of the user as a communication medium, including the steps of performing mutual authentication with the mobile device by performing communication via the body of the user as the communication medium (e.g., the processing in steps S51 to S60 of FIG. 7), sensing the biometric information of the user (e.g., the processing in step S101 of FIG. 8), determining whether the sensed biometric information of the user matches the template transmitted from the mobile device via the body of the user based on information obtained by comparing the biometric information with the template (e.g., the processing in step S104 of FIG. 8), and outputting a preset control signal in a case where the mobile device is verified as a valid mobile device based on a mutual authentication result and in a case where it is determined that the biometric information and the template match each other (e.g., the processing in step S106 of FIG. 8).

An information processing apparatus according to another embodiment of the present invention is an information processing apparatus for performing communication with a mobile device that is carried by a user and that stores in advance biometric information of the user as a template via the body of the user as a communication medium, including mutual authentication means (e.g., the controller 155 shown in FIG. 2 for performing the processing in steps S251 to S260 of FIG. 9) for performing mutual authentication with the mobile device by performing communication via the body of the user as the communication medium, sensing means (e.g., the biometric-information sensing unit 152 shown in FIG. 2) for sensing the biometric information of the user, biometric-information transmitting means (e.g., the controller 155 shown in FIG. 2 for performing the processing in step S261 of FIG. 9) for transmitting the biometric information of the user sensed by the sensing means via the body of the user, and control-signal output means (e.g., the controller 155 shown in FIG. 2 for performing the processing in step S304 of FIG. 10) for outputting a preset control signal in a case where the mobile device is verified as a valid mobile device based on a mutual authentication result obtained by the mutual authentication means and in a case where the mobile device, which has received the biometric information of the user transmitted from the biometric-information transmitting means, receives via the body of the user information indicating a determination result that the biometric information and the template are determined to match each other.

Figure 10:
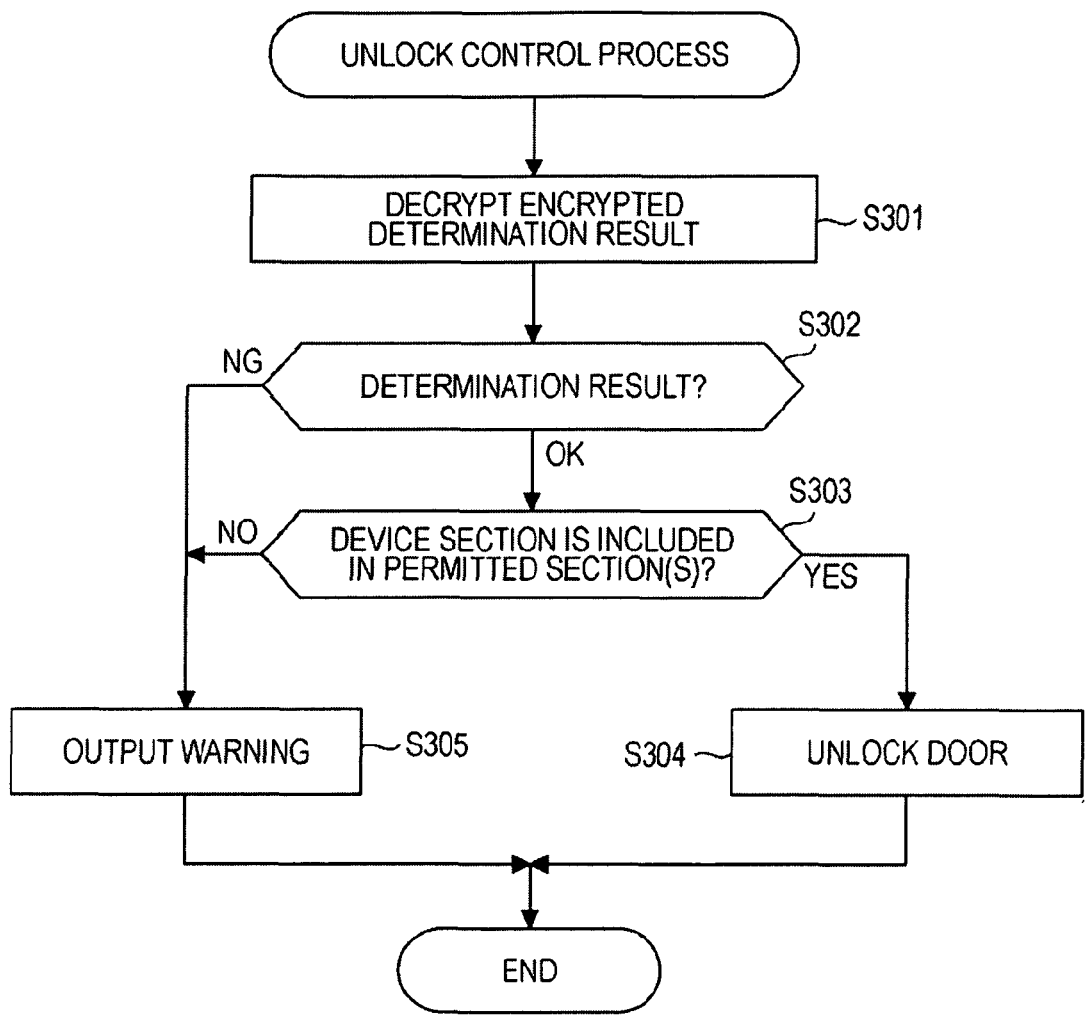
FIG. 10 is a flowchart of an exemplary unlock control process shown in FIG. 9.

An information processing method according to another embodiment of the present invention is an information processing method for an information processing apparatus for performing communication with a mobile device that is carried by a user and that stores in advance biometric information of the user as a template via the body of the user as a communication medium, including the steps of performing mutual authentication with the mobile device by performing communication via the body of the user as the communication medium (e.g., the processing in steps S251 to S260 of FIG. 9), sensing the biometric information of the user and transmitting the sensed biometric information of the user via the body of the user (e.g., the processing in step S261 of FIG. 9), and outputting a preset control signal in a case where the mobile device is verified as a valid mobile device based on a mutual authentication result and in a case where the mobile device, which has received the transmitted biometric information of the user, receives via the body of the user information indicating a determination result that the biometric information and the template are determined to match each other (e.g., the processing in step S304 of FIG. 10).

Embodiments of the present invention will now be described with reference to the drawings.

FIG. 1 is a block diagram of an exemplary structure of a door-lock control system according to an embodiment of the present invention.

A door-lock control system 100 shown in FIG. 1 unlocks a door 102 in the case where a user 101 is authenticated. A sensor 103 provided on the door 102 senses biometric information of the user 101 and compares the sensed biometric information with pre-stored biometric information of the user 101 in a mobile device 104 carried by the user 101, thereby verifying whether the user 101 is valid. In the case where the user 101 is verified as a valid user, the sensor 103 controls a driver 105 to unlock the door 102.

Biometric information is information for specifying physiological features of the user 101, such as the pattern of palm veins or fingerprints. Hereinafter, a user's biometric information stored in advance in the mobile device 104 is appropriately referred to as a template.

For example, the user 101 places the user's hand on the sensor 103 on the door 102. The sensor 103 senses the pattern of palm veins of the user 101 and generates information for specifying the vein pattern.

The mobile device 104 is integrated with, for example, a mobile phone or an integrated-circuit (IC) card, and stores the template.

The sensor 103 and the mobile device 104 can perform wireless communication with each other via the body of the user 101 as a communication medium.

For example, the sensor 103 and the mobile device 104 each include, as will be described later, a signal electrode and a reference electrode. The signal electrode for transmitting a signal is provided so that the signal electrode has stronger electrostatic coupling with the body (human body) of the user 101 than the reference electrode, which is an electrode for obtaining a reference point for determining the level of a signal. By applying an electric signal (potential difference) between the signal electrode and the reference electrode, the reference electrode forms capacitance with its surrounding space. Using the capacitance with the space, signal transfer between the sensor 103 and the mobile device 104 is enabled. Accordingly, the sensor 103 and the mobile device 104 can perform wireless communication with each other via the body of the user 101 as a communication medium.

Wireless communication via a human body as a communication medium is described in detail in, for example, Japanese Unexamined Patent Application Publication No. 2006-268614.

Figure 2:
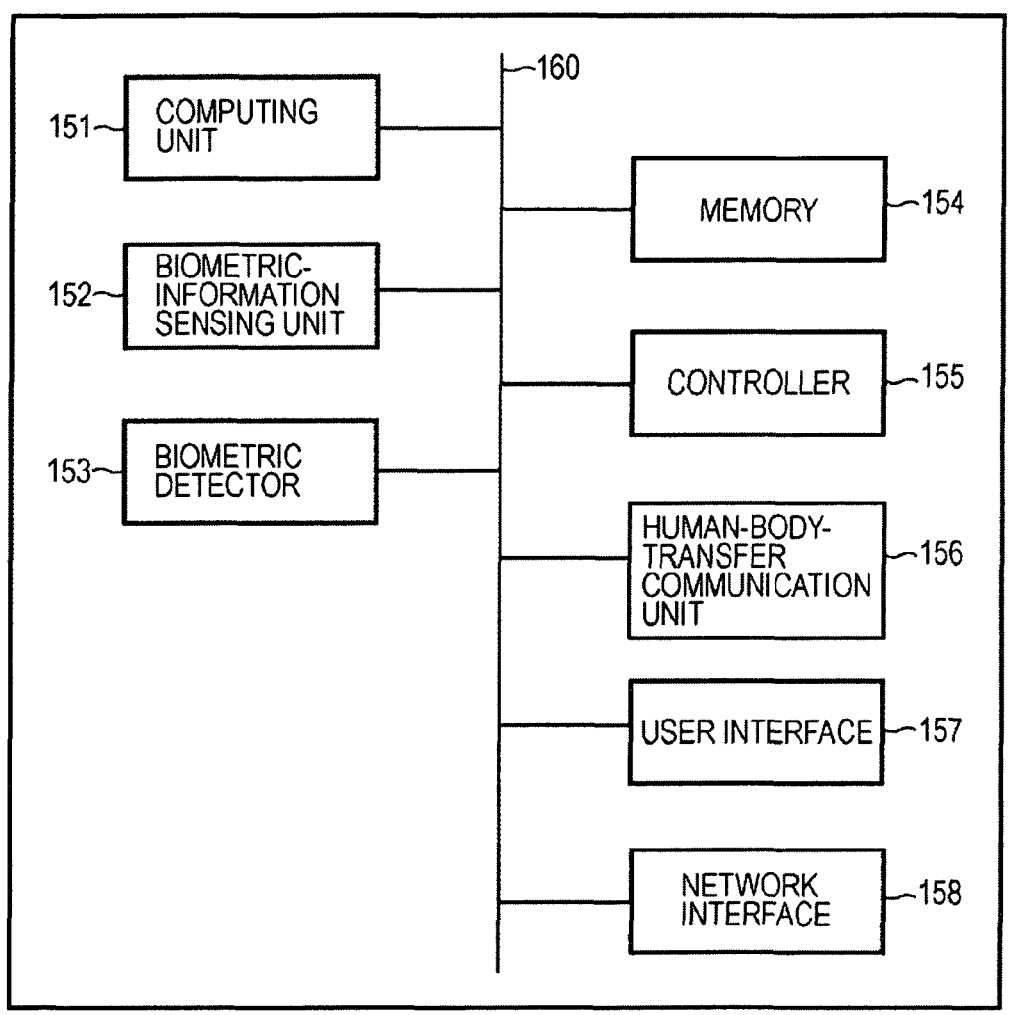
FIG. 2 is a block diagram of an exemplary structure of a sensor shown in FIG. 1.

FIG. 2 is a block diagram of an exemplary structure of the sensor 103.

A biometric detector 153 shown in FIG. 2 determines whether the user is presenting part of the user's body (e.g., palm) to a biometric-information sensing unit 152. In the case where it is determined that the user is presenting part of the user's body to the biometric-information sensing unit 152, the biometric-information sensing unit 152 senses biometric information.

The biometric-information sensing unit 152 includes, for example, an image sensor or the like. The biometric-information sensing unit 152 captures an image of part of the user's body presented thereto and generates information for specifying the user's physiological feature based on the image data as data.

A computing unit 151 performs processing including comparing the biometric information sensed by the biometric-information sensing unit 152 with the template. The computing unit 151 outputs, for example, information indicating the degree of match between the sensed biometric information and the template. If the degree of match is higher than, for example, a preset threshold, the user corresponding to the biometric information sensed by the biometric-information sensing unit 152 can be verified as the same person as a user corresponding to the template.

A controller 155 includes, for example, a processor for controlling the components of the sensor 103. The controller 155 performs various processes based on data and programs stored in a memory 154. The memory 154 further stores data for performing mutual authentication with the mobile device 104, which will be described later.

A human-body-transfer communication unit 156 is connected to the above-described signal electrode and reference electrode. The human-body-transfer communication unit 156 transmits/receives signals to/from the mobile device 104 by performing wireless communication via a human body as a communication medium.

A user interface 157 includes a switch, a button, a keyboard, or the like for receiving an instruction from the user. The user interface 157 may further include, if necessary, a display for displaying an image and a loudspeaker for outputting sound.

A network interface 158 is an interface for performing communication based on, for example, a protocol in compliance with a local area network (LAN) such as Ethernet® or a wireless LAN. A control signal for controlling the driver 105 or the like is transmitted/received via the network interface 158.

The computing unit 151 to the network interface 158 are interconnected via a bus 160.

Figure 3:
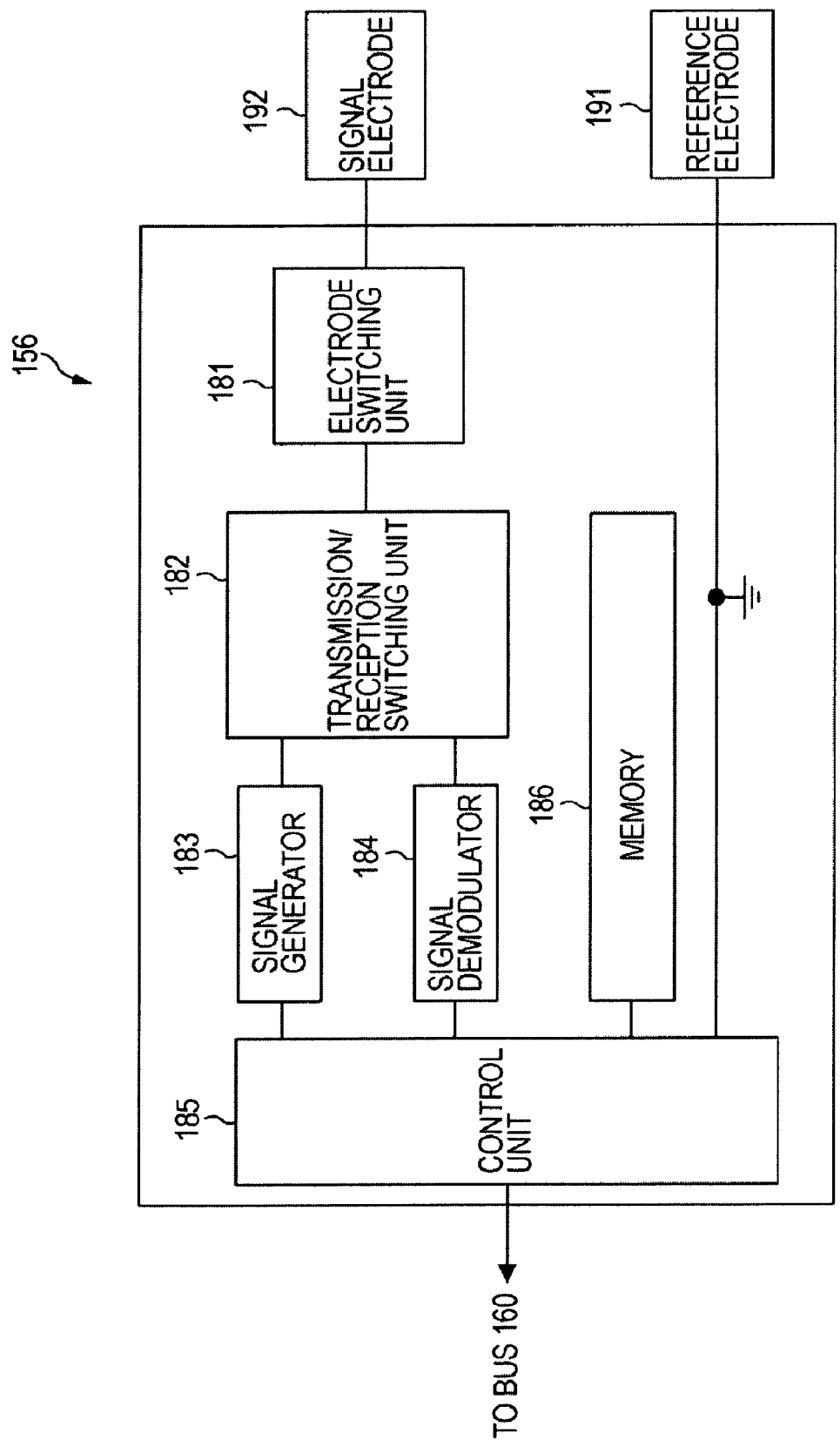
FIG. 3 is a block diagram of an exemplary structure of a human-body-transfer communication unit shown in FIG. 2.

FIG. 3 is a block diagram of an exemplary structure of the human-body-transfer communication unit 156. Referring to FIG. 3, in the case where a plurality of signal electrodes 192 are provided, an electrode switching unit 181 switches on and off the continuity of the individual signal electrodes 192.

Under control of, for example, a control unit 185, a transmission/reception switching unit 182 switches between a signal generator 183 and a signal demodulator 184 for establishing connection with the electrode switching unit 181.

When transmitting information to the mobile device 104, the signal generator 183 under control of the control unit 185 generates a signal corresponding to the information. Upon receipt of information (signal corresponding to the information) from the mobile device 104, the signal demodulator 184 demodulates the signal and supplies the demodulated signal to the control unit 185.

The control unit 185 controls the components of the human-body-transfer communication unit 156. For example, the control unit 185 controls the operation of the signal generator 183 or the signal demodulator 184 to generate a transmission signal corresponding to data to be transmitted to the mobile device 104. The control unit 185 stores data corresponding to a signal supplied through processing performed by the signal demodulator 184 based on a reception signal received from the mobile device 104 in a memory 186, if necessary.

The memory 186 includes, for example, electrically erasable programmable read-only memory (EEPROM) or the like. The memory 186 stores various pieces of data under control of the control unit 185.

A reference electrode 191 and the signal electrode 192 correspond to the above-described reference electrode and signal electrode, respectively. The signal electrode 192 is provided close to a communication medium such as a human body (e.g., part of the body of the user 101). The reference electrode 191 is provided facing the space. Alternatively, the signal electrode 192 may be provided substantially at the same position as the biometric-information sensing unit 152. In this way, sensing of biometric information of the user 101 and wireless communication with the mobile device 104 via a human body as a communication medium can be started at the same time.

Figure 4:
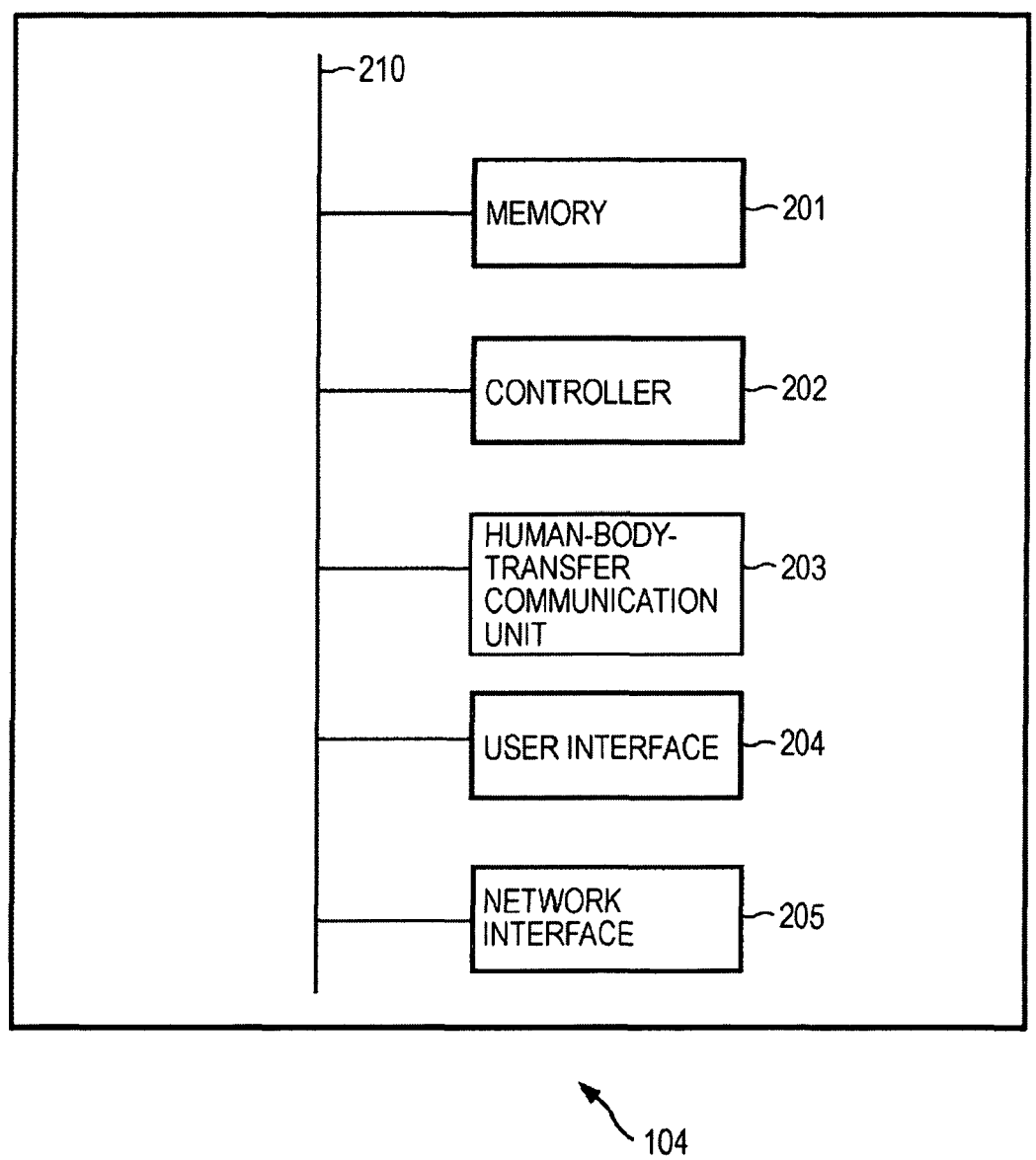
FIG. 4 is a block diagram of an exemplary structure of a mobile device shown in FIG. 1.

FIG. 4 is a block diagram of an exemplary structure of the mobile device 104.

A controller 202 includes, for example, a processor for controlling the components of the mobile device 104. The controller 202 performs various processes based on data and programs stored in a memory 201. The memory 201 further stores, as will be described later, data for performing mutual authentication with the sensor 103 and a template, which is biometric information of the user 101.

A human-body-transfer communication unit 203 is connected to the above-described signal electrode and reference electrode. The human-body-transfer communication unit 203 performs signal transfer with the sensor 103 by performing wireless communication via a human body as a communication medium. Since the detailed structure of the human-body-transfer communication unit 203 is similar to that described above with reference to FIG. 3, FIG. 3 is adopted. In the mobile device 104, the signal electrode 192 is provided close to, for example, the body of the user 101. The reference electrode 191 is provided facing the space.

A user interface 204 includes a switch, a button, a keyboard, or the like for receiving an instruction from the user.

The user interface 204 may further include, if necessary, a display for displaying an image and a loudspeaker for outputting sound.

A network interface 205 is an interface for performing communication based on, for example, a protocol in compliance with a LAN such as Ethernet® or a wireless LAN. The network interface 205 performs communication with various electronic apparatuses connected thereto via a network.

The memory 201 to the network interface 205 are interconnected via a bus 210.

The sensor 103 and the mobile device 104 perform mutual authentication when performing wireless communication with each other via a human body as a communication medium, which will be described in detail later. An example in which the sensor 103 and the mobile device 104 perform mutual authentication based on public-key cryptography such as Rivest Shamir Adleman (RSA) will now be described. In mutual authentication based on the public-key cryptography, the sensor 103 and the mobile device 104 exchange challenges and responses using a public key and a secret key and verify whether the other device is a valid device. It is assumed that cryptographic keys (the public key and the secret key) of the sensor 103 and the mobile device 104 for use in mutual authentication are managed based on a public key infrastructure (PKI).

That is, the controller 155 of the sensor 103 and the controller 202 of the mobile device 104 execute processing for performing mutual authentication based on public-key cryptography such as RSA and, if necessary, encrypt or decrypt information. The memory 154 of the sensor 103 and the memory 201 of the mobile device 104 each store a program for allowing the controller 155 or the controller 202 to execute processing relating to the foregoing mutual authentication and information such as a device ID and cryptographic keys which are necessary for performing mutual authentication.

FIG. 5 illustrates exemplary information stored in the memory 201 of the mobile device 104. As shown in FIG. 5, the memory 201 at least stores information regarding a device ID, keys (cryptographic keys), an attribute, a certificate, a template, and a public key of a certificate authority (CA). A CA is an authority of the PKI.

The device ID is information including a character, a numeral, or the like for specifying the mobile device 104. In this example, the device ID "1234" is stored in the memory 201.

The keys include a secret key and a public key for use in encryption or decryption based on the RSA algorithm. In this example, a secret key KSd and a public key KPd are stored in the memory 201.

The attribute is, for example, information for specifying the door 102 that can be unlocked by the user 101 who carries the mobile device 104. In this example, permitted sections "A, B, and C" are stored in the memory 201. For example, information for specifying the location of the door 102 on which the sensor 103 is provided is compared with information stored as the permitted sections. In the case where the information for specifying the location of the door 102 is included in the information stored as the permitted sections, the door 102 can be unlocked.

Other information necessary for performing mutual authentication with the sensor 103 may be stored as an attribute.

The certificate is information for certifying to the sensor 103 that the public key KPd of the mobile device 104 is valid. For example, the certificate is generated by, for example, encrypting information including the above-described device ID "1234", public key KPd, and attribute and encrypting a hash value of this information using a secret key of the CA. The certificate is added as a signature of the CA.

The template is biometric information of the user 101, who is a valid owner of the mobile device 104.

In this example, a public key KPc is stored as a public key of the CA in the memory 201.

Besides these pieces of information, various programs and data relating to preset values are also stored in the memory 201.

FIG. 6 illustrates exemplary information stored in the memory 154 of the sensor 103. As shown in FIG. 6, the memory 154 at least stores information regarding a device ID, keys (cryptographic keys), an attribute, a certificate, a public key of the CA, and a certificate revocation list (CRL). A CRL is a list of, for example, revoked certificates that have been distributed as data from the CA. The sensor 103 matches a certificate transmitted from the mobile device 104 against the CRL and checks whether the certificate is currently valid.

The device ID is information including a character, a numeral, or the like for specifying the sensor 103. In this example, the device ID "9876" is stored in the memory 154.

The keys include a secret key and a public key for use in encryption or decryption based on the RSA algorithm. In this example, a secret key KSr and a public key KPr are stored in the memory 154.

The attribute is, for example, information for specifying the door 102 on which the sensor 103 is provided. In this example, a device section "B" is stored in the memory 154. For example, in the case where the device section "B" of the sensor 103 is included in the foregoing information stored as the permitted sections of the mobile device 104, the door 102 is unlocked. In the case where the device section "B" is not included in the information stored as the permitted sections of the mobile device 104, the door 102 is not unlocked.

Other information necessary for performing mutual authentication with the mobile device 104 may be stored as an attribute.

The certificate is information for certifying to the mobile device 104 that the public key KPr of the sensor 103 is valid. For example, the certificate is generated by, for example, encrypting information including the foregoing device ID "9876", public key KPr, and attribute and encrypting a hash value of this information using a secret key of the CA. The certificate is added as a signature of the CA.

The public key KPc is also stored as a public key of the CA in the memory 154.

Further, the foregoing CRL is also stored in the memory 154. For example, in the case where the sensor 103 can communicate with the CA via a network, the sensor 103 receives the latest CRL issued by the CA via the network and stores the latest CRL in the memory 154. In the case where the sensor 103 has difficulty in communicating with the CA via the network, for example, a medium drive controller into which a predetermined recording medium having the latest CRL issued by the CA recorded thereon is connected to the sensor 103 via, for example, the network interface 158, and the sensor 103 reads the CRL from the recording medium and stores the CRL in the memory 154.

Next, a communication process performed between the mobile device 104 and the sensor 103 will now be described with reference to an arrow chart shown in FIG. 7. This process is executed when the mobile device 104 and the sensor 103 are enabled to perform wireless communication with each other via a human body as a communication medium. In the case where the signal electrode 192 is provided substantially at the same position as the biometric-information sensing unit 152 in the sensor 103, this process may be executed when the biometric detector 153 determines that the user 101 is presenting part of the body (e.g., a palm) to the biometric-information sensing unit 152.

In step S11, the mobile device 104 transmits the certificate information stored in the memory 201 to the sensor 103. In step S51, the sensor 103 receives the certificate information.

In step S52, the sensor 103 executes a certificate checking process. In this case, the sensor 103 also checks whether the certificate received in step S51 has not been revoked on the basis of the CRL stored in the memory 154. If the certificate has not been revoked, the CA's signature included in the certificate information received in step S51 is decrypted using the CA's public key KPc stored in the memory 154. The sensor 103 computes a hash value of information including the device ID "1234", the public key KPd, and the attribute, which are included in the certificate information received in step S51, using a preset algorithm and compares the hash value with the CA's decrypted signature. If the hash value matches the CA's signature, the validity of the certificate transmitted from the mobile device 104 is verified. If the hash value does not match the CA's signature, the validity of the certificate transmitted from the mobile device 104 is not verified.

If the result of processing in step S52 shows that the validity of the certificate transmitted from the mobile device 104 is verified, the process proceeds to step S53. In contrast, if the validity of the certificate transmitted from the mobile device 104 is not verified, the process ends. In the case where the validity of the certificate transmitted from the mobile device 104 is not verified, for example, a message indicating that the certificate is invalid may be displayed on the display or output from the loudspeaker included in the user interface 157, and then the process ends.

In step S53, the sensor 103 transmits the certificate information stored in the memory 154 to the mobile device 104. In step S12, the mobile device 104 receives the certificate information.

In step S13, the mobile device 104 executes a certificate checking process. In this case, the mobile device 104 decrypts the CA's signature included in the certificate information received in step S12 using the CA's public key KPc stored in the memory 201. The mobile device 104 computes a hash value of information including the device ID "9876", the public key KPr, and the attribute, which are included in the certificate information received in step S12, using a preset algorithm and compares the hash value with the CA's decrypted signature. If the hash value matches the CA's signature, the validity of the certificate transmitted from the sensor 103 is verified. If the hash value does not match the CA's signature, the validity of the certificate transmitted from the sensor 103 is not verified.

If the result of processing in step S13 shows that the validity of the certificate transmitted from the sensor 103 is verified, the process proceeds to step S14. In contrast, if the validity of the certificate transmitted from the sensor 103 is not verified, the process ends. In the case where the validity of the certificate transmitted from the sensor 103 is not verified, for example, a message indicating that the certificate is invalid may be displayed on the display or output from the loudspeaker included in the user interface 204, and then the process ends.

In step S14, the mobile device 104 generates, for example, a random number, encrypts the random number using the public key KPr of the sensor 103, which is included in the certificate received in the processing in step S12, and transmits the encrypted random number as a challenge to the sensor 103. In step S54, the sensor 103 receives the challenge.

In step S55, the sensor 103 decrypts the challenge received in step S54 using the secret key KSr stored in the memory 154, encrypts information obtained as a result of decryption (the random number generated by the mobile device 104) using the public key KPd of the mobile device 104, which is included in the certificate received in step S51, and transmits the encrypted information as a response to the mobile device 104. At the same time, key generation information K1 for generating a session key for use in subsequent communication is transmitted together with the response. In step S15, the mobile device 104 receives the response and the key generation information K1.

In step S16, the mobile device 104 executes a sensor authentication process. In this case, the mobile device 104 decrypts the response received in step S15 using the secret key KSd stored in the memory 201 and compares information obtained as a result of decryption with the random number generated in step S14. In the case where the decrypted information matches the random number, the validity of the sensor 103 is verified. In the case where the decrypted information does not match the random number, the validity of the sensor 103 is not verified. The authentication result indicating whether the validity of the sensor 103 has been verified is transmitted in step S17 to the sensor 103, and the sensor 103 receives the authentication result in step S56.

In the case where the sensor 103 receives in step S56 the authentication result indicating that the validity of the sensor 103 has been verified (successful authentication), the process proceeds to step S57. In the case where the sensor 103 receives in step S56 the authentication result indicating that the validity of the sensor 103 has not been verified (authentication failure), the process ends. In the case of the authentication failure, a message indicating that the authentication has failed may be displayed on the display or output from the loudspeaker included in the user interface 157, and then the process ends.

In step S57, the sensor 103 generates a random number, for example, encrypts the random number using the public key KPd of the mobile device 104, which is included in the certificate received in the processing in step S51, and transmits the encrypted random number as a challenge to the mobile device 104. In step S18, the mobile device 104 receives the challenge.

In step S19, the mobile device 104 decrypts the challenge received in step S18 using the secret key KSd stored in the memory 201, encrypts information obtained as a result of decryption (the random number generated by the sensor 103) using the public key KPr of the sensor 103, which is included in the certificate received in step S12, and transmits the encrypted information as a response to the sensor 103. In this case, key generation information K2 for generating a session key for use in later communication is transmitted together with the response. In step S58, the sensor 103 receives the response and the key generation information K2.

In step S59, the sensor 103 executes a mobile-device authentication process. In this case, the sensor 103 decrypts the response received in step S58 using the secret key KSr stored in the memory 154 and compares information obtained as a result of decryption with the random number generated in step S57. In the case where the decrypted information matches the random number, the validity of the mobile device 104 is verified. In the case where the decrypted information does not match the random number, the validity of the mobile device 104 is not verified. In step S60, the authentication result indicating whether the validity of the mobile device 104 has been verified is transmitted to the mobile device 104. In step S20, the mobile device 104 receives the authentication result.

In the case where the mobile device 104 receives in step S20 the authentication information indicating that the validity of the mobile device 104 has been verified (successful authentication), the process proceeds to step S21. In the case where the mobile device 104 receives in step S20 the authentication result indicating that the validity of the mobile device 104 has not been verified (authentication failure), the process ends. In the case of the authentication failure, a message indicating that the authentication has failed may be displayed on the display or output from the loudspeaker included in the user interface 204, and then the process ends.

With the foregoing process, mutual authentication based on public-key cryptography is performed between the mobile device 104 and the sensor 103.

In step S21, the mobile device 104 transmits the template stored in the memory 201 to the sensor 103. In step S61, the sensor 103 receives the template. In this case, the template has been encrypted using a session key K3 generated on the basis of the key generation information K1 received in step S15 and the key generation information K2 transmitted in step S19 and then transmitted. Encryption using a session key is performed using a preset encryption algorithm, which is a common-key cryptographic algorithm including the Data Encryption Standard (DES), the Advanced Encryption Standard (AES), or the like.

In step S62, the sensor 103 executes an unlock control process. With reference to the flowchart shown in FIG. 8, the unlock control process in step S62 of FIG. 7 will now be described in detail.

In step S101, the sensor 103 controls the biometric-information sensing unit 152 to sense biometric information of the user 101. The sensing of biometric information of the user 101 may be performed prior to executing the unlock control process, that is, for example, in parallel to the processing in steps S51 to step S61 of FIG. 7.

In step S102, the sensor 103 decrypts the encrypted template received in step S61 of FIG. 7 using the session key K3 generated on the basis of the key generation information K1 transmitted in step S55 and the key generation information K2 received in step S58.

In step S103, the sensor 103 compares the biometric information of the user 101, which has been sensed in step S101, with the template decrypted in step S102.

In step S104, the sensor 103 determines whether the biometric information matches the template based on the result of processing in step S103. The biometric information and the template are pieces of information indicating, for example, the palm vein pattern of the user 101. If the matching of the sensed biometric information against the template is too strictly performed, the user 101 who is an authenticate user may not be verified as valid depending on, for example, the condition of the user 101 or the condition of the sensor 103. Therefore, a relatively lenient criterion is used to determine whether the sensed biometric information matches the template, and a determination with a certain acceptable range is performed. For example, a numeral indicating the degree of match between the biometric information and the template is computed, and whether the biometric information matches the template is determined by determining whether the numeral is greater than or equal to a threshold.

In the case where it is determined in step S104 that the biometric information matches the template, the process proceeds to step S105. The sensor 103 determines whether information indicating the device section, which is stored in the memory 154, is included in information indicating permitted sections, which is the attribute included in the certificate received in step S51. For example, in the case where the device section is "B" and the permitted sections are "A, B, and C", it is determined that the device section is included in the permitted sections, and the process proceeds to step S106.

In step S106, the sensor 103 transmits, for example, a control signal to the driver 105 via the network interface 158, thereby unlocking the door 102.

In contrast, in the case where it is determined in step S104 that the biometric information does not match the template, or in the case where it is determined in step S105 that the device section is not included in the permitted sections, the process proceeds to step S107, and the sensor 103 outputs, for example, a warning message indicating that the user 101 is not permitted to enter or exit through the door 102 by displaying it on the display or outputting it from the loudspeaker included in the user interface 157.

Accordingly, in the case where communication is performed between the mobile device 104 and the sensor 103 via a human body as a communication medium and the user 101 is verified as a valid user, the door 102 is unlocked. The processing in the foregoing steps is actually done by executing a predetermined program or the like using the controller 155 or the controller 202.

Since communication between the mobile device 104 and the sensor 103 is performed via the body of the user 101 as a communication medium, for example, even in the case where the user 101 has a bag in the user's hand, it is not necessary for the user 101 to take out the mobile device 104 and bring the mobile device 104 closer to the sensor 103. When the user 101 simply touches the sensor 103 with an empty hand, the door 102 can be unlocked.

Since verification of the validity of the user 101 is performed based on biometric information, the risk of fraud such as a different person assuming the identity of the user 101 can be reduced.

Since the biometric information of the user 101 is stored as a template in the mobile device 104, biometric authentication can be quickly performed at low cost without establishing a connection between, for example, the sensor 103 and a server via a network.

Since mutual authentication is performed between the mobile device 104 and the sensor 103, the user 101 can be authenticated in a more reliable manner. Since the cryptographic keys of the sensor 103 and the mobile device 104 for use in mutual authentication are managed based on the PKI, the door 102 is prevented from being mistakenly unlocked by an invalid user by, for example, checking the CRL prior to mutual authentication. For example, in order to exclude a specific user as an invalid user, that user can be disabled from unlocking the door 102 by revoking a certificate stored in that user's mobile device, without changing information stored in other users' mobile devices.

Therefore, reliable user authentication can be realized at low cost.

In the foregoing process described with reference to FIG. 7, a template is encrypted and then transmitted. Although it is not easy to decrypt the encrypted information and to falsify biometric information, it is not desirable to transmit/receive during communication a template that is information for specifying a user. In such a case, biometric information sensed by the sensor 103 may be transmitted to the mobile device 104, and the mobile device 104 may determine whether the biometric information matches the template.

FIG. 9 is an arrow chart for describing another exemplary communication process performed between the mobile device 104 and the sensor 103 in the case where biometric information sensed by the sensor 103 is transmitted to the mobile device 104, and the mobile device 104 determines whether the biometric information matches the template.

Since the processing in steps S211 to S220 and the processing in steps S251 to S260 of FIG. 9 are similar to that in steps S11 to S20 and that in steps S51 to S60 of FIG. 7, detailed descriptions thereof are omitted. With the process up to this point, mutual authentication based on public-key cryptography is performed between the mobile device 104 and the sensor 103.

In the case where it is determined in step S259 that the mobile device 104 is successfully authenticated, the sensor 103 transmits the authentication result in step S260, controls the biometric-information sensing unit 152 in step S261 to sense biometric information of the user 101, and transmits the sensed biometric information to the mobile device 104. Alternatively, the sensing of biometric information of the user 101 may be performed in parallel to, for example, the processing in steps S251 to S260.

In step S221, the mobile device 104 receives the biometric information transmitted in step S261. In step S222, the mobile device 104 executes a biometric-information determining process. In the processing in step S222, the biometric information, which has been sensed by the sensor 103 and received in step S221, is compared with the template stored in the memory 201, and whether the biometric information matches the template is determined.

That is, in step S222, the processing corresponding to steps S103 and S104 of FIG. 8 is executed by the mobile device 104.

In step S223, the mobile device 104 transmits the determination result obtained by the processing in step S222 (whether the biometric information matches the template) to the sensor 103. In step S262, the sensor 103 receives the determination result. In this case, the determination result has been encrypted using the session key K3 generated on the basis of the key generation information K1 received in step S215 and the key generation information K2 transmitted in step S219 and then transmitted. Encryption using a session key is performed using a preset encryption algorithm, which is a common-key cryptographic algorithm including DES, AES, or the like.

In step S263, the sensor 103 executes an unlock control process. With reference to the flowchart of FIG. 10, the unlock control process in step S263 of FIG. 9 will now be described in detail.

In step S301, the sensor 103 decrypts the encrypted determination result received in step S262 of FIG. 9 using the session key K3 generated on the basis of the key generation information K1 transmitted in step S255 and the key generation information K2 received in step S258.

In step S302, the sensor 103 determines whether the decrypted determination result obtained in step S301 indicates that the biometric information matches the template (OK) or the biometric information does not match the template (NG). In the case where the biometric information matches the template (OK), the process proceeds to step S303.

In step S303, the sensor 103 determines whether information indicating the device section, which is stored in the memory 154, is included in information indicating permitted sections, which is the attribute included in the certificate received in step S251. For example, in the case where the device section is "B" and the permitted sections are "A, B, and C", it is determined that the device section is included in the permitted sections, and the process proceeds to step S304.

In step S304, the sensor 103 transmits, for example, a control signal to the driver 105 via the network interface 158, thereby unlocking the door 102.

In contrast, in the case where it is determined in step S302 that the biometric information does not match the template (NG), or in the case where it is determined in step S303 that the device section is not included in the permitted sections, the process proceeds to step S305, and the sensor 103 outputs, for example, a warning message indicating that the user 101 is not permitted to enter or exit through the door 102 by displaying it on the display or outputting it from the loudspeaker included in the user interface 157.

Accordingly, in the case where communication is performed between the mobile device 104 and the sensor 103 via a human body as a communication medium and the user 101 is verified as a valid user, the door 102 is unlocked. The processing in the foregoing steps is actually done by executing a predetermined program or the like using the controller 155 or the controller 202.

In the foregoing example described with reference to FIGS. 9 and 10, the mobile device 104 performs determination whether the biometric information matches the template. Thus, it is not necessary to transmit the template, and more secure authentication can be performed, as compared with the case described with reference to FIGS. 7 and 8.

Although the examples in which the embodiment of the present invention is applied to the door-lock control system 100 have been described, the embodiment of the present invention is applicable to, for example, an engine-start control system for automobiles. For example, the sensor 103 is provided on a steering wheel of an automobile. If the user 101 holding the steering wheel is a valid user, the engine of the automobile is activated.

Further, the embodiment of the present invention is applicable to, for example, a login authentication control system for personal computers.

Although the case in which the CRL is stored in the memory 154 of the sensor 103 has been described above, the CRL may additionally be stored in the memory 201 of the mobile device 104, and the mobile device 104 may also check whether the certificate transmitted from the sensor 103 has not been revoked.

Although the example in which the cryptographic keys of the sensor 103 and the mobile device 104 for use in mutual authentication are managed based on the PKI and mutual authentication based on public-key cryptography including RSA or the like is performed has been described above, it is not necessary to perform mutual authentication based on public-key cryptography based on the PKI in all cases. That is, it is only necessary to enable the sensor 103 and the mobile device 104 to reliably perform mutual authentication with each other.

The mobile device 104 according to the embodiment of the present invention is not limited to one integrated with a mobile phone or an IC card. The mobile device 104 may also be integrated with, for example, a digital still camera, a personal computer, or personal digital assistants (PDAs) of other types.

The series of processes described above can be performed using hardware or software. If software is employed to perform this series of processes, a program constituting the software is installed from a program recording medium onto a computer included in dedicated hardware or, for example, an apparatus capable of performing various functions using various programs installed thereon.

The program executed by the computer may be recorded on a removable medium, which is a packaged medium including a magnetic disk (including a flexible disk), an optical disk (including a compact disc-read only memory (CD-ROM) and a digital versatile disc (DVD)), a magneto-optical disk, or a semiconductor memory and provided to the computer, or may be provided via a wired or wireless transmission medium, such as a LAN, the Internet, or digital satellite broadcasting.

The program can be installed by, for example, connecting a device or the like having a drive into which the removable medium is mounted via the network interface 158 to the sensor 103 or via the network interface 205 to the mobile device 104 and storing the program read via the drive into the memory 154 or the memory 201. Alternatively, the program may be installed in advance by storing in advance the program in, for example, the memory 154 or the memory 201.

The program executed by the computer may be a program allowing a series of steps to be performed sequentially in the order described in the present specification, as well as a series of steps performed in parallel or at a necessary time such as when a series of steps is called.

It should be understood by those skilled in the art that various modifications, combinations, sub-combinations and alterations may occur depending on design requirements and other factors insofar as they are within the scope of the appended claims or the equivalents thereof.

What is claimed is:

1. An authentication system comprising:
  a mobile device carried by a user; and
  a sensor configured to sense biometric information of the user, the mobile device and the sensor communicating with each other via a human body as a communication medium,
  wherein the mobile device includes:
    a processor; and
    a memory coupled to the processor which stores instructions that, when executed on the processor, cause the mobile device to:
      store the biometric information of the user as a template,
      perform first mutual authentication with the sensor by performing communication via the body of the user as a communication medium, wherein the first mutual authentication with the sensor is performed by:
        sending to the sensor a certificate of the mobile device for verification;
        receiving a certificate of the sensor;
        verifying the validity of the certificate of the sensor;
        sending a first challenge to the sensor, in response to verifying that the certificate of the sensor is valid;
        receiving a first response and a first key generation information from the sensor;
        authenticating the sensor based on the received response;
        sending a first authentication result to the sensor;
        receiving a second challenge from the sensor;
        generating a second response and a second key generation information;
        sending the generated second response and the second key generation information to the sensor for verification; and
        receiving a second authentication result from the sensor;
      encrypting the stored template, the stored template being encrypted using a session key generated based on the first key generation information and the second key generation information; and
      transmit the encrypted stored template to the sensor via the body of the user in a case where the sensor is verified as a valid sensor, and
  wherein the sensor includes:
    a sensor processor; and
    a sensor memory coupled to the sensor processor which stores instructions that, when executed on the sensor processor, cause the sensor to:
      perform second mutual authentication with the mobile device by performing communication via the body of the user as the communication medium, wherein the second mutual authentication with the mobile device is performed by:
        receiving a certificate of the mobile device from the mobile device;
        verifying the certificate of the mobile device;
        sending to the mobile device a certificate of the sensor in response to verifying that the certificate of the mobile device is valid;
        receiving a first challenge from the mobile device, in response to verifying that the certificate of the sensor is valid;
        generating a first response and a first key generation information;
        sending the first response and the first key generation information to the mobile device;
        receiving a first authentication result from the mobile device;
        sending a second challenge to the mobile device;
        receiving a second response and a second key generation information from the mobile device;
        verifying the second response; and
        sending a second authentication result to the sensor;
        receiving a template from the mobile device, wherein the template is encrypted a session key generated based on the first key generation information and the second key generation information;
      sense the biometric information of the user,
      determine whether the sensed biometric information of the user matches the template transmitted from the mobile device via the body of the user based on degree-of-match information obtained by comparing the biometric information with the template, and
      output a preset control signal in a case where the mobile device is verified as a valid mobile device based on a second mutual authentication result obtained by the second mutual authentication and in a case where the determination indicates that the biometric information and the template match each other.

2. The authentication system of claim 1, wherein the memory stores a device ID, cryptographic keys, an attribute, the certificate of the mobile device, a public key of a certificate authority, and the template.

3. The authentication system of claim 2, wherein the cryptographic keys comprise a secret key and a public key for use in encryption and decryption, and wherein the attribute comprises information specifying the action that can be taken if the sensor is verified as a valid sensor.

4. The authentication system of claim 1,
  wherein the degree-of-match information comprises information indicating the degree-of-match between the sensed biometric information and the template, wherein the degree-of-match information is compared to a preset value, and wherein if the degree-of-match information is greater than the preset value, the sensed biometric information of the user matches the template transmitted from the mobile device.

5. An information processing apparatus that is carried by a user and that performs communication via the body of the user as a communication medium with a sensor that senses biometric information of the user, comprising:

a processor; and a memory coupled to the processor which stores instructions that, when executed on the processor, cause the apparatus to:

store the biometric information of the user as a template;

perform mutual authentication with the sensor by performing communication via the body of the user as the communication medium, wherein mutual authentication is performed with the sensor by sending to the sensor a certificate of the mobile device for verification;

receiving a certificate of the sensor;

verifying the validity of the certificate of the sensor;

sending a first challenge to the sensor, in response to verifying that the certificate of the sensor is valid;

receiving a first response and a first key generation information from the sensor;

authenticating the sensor based on the received response;

sending a first authentication result to the sensor;

receiving a second challenge from the sensor;

generating a second response and a second key generation information;

sending the generated second response and the second key generation information to the sensor for verification; and receiving a second authentication result from the sensor;

encrypting the stored template, the stored template being encrypted using a session key generated based on the first key generation information and the second key generation information;

transmitting the encrypted stored template to the sensor via the body of the user in a case where the sensor is verified as a valid sensor based on a mutual authentication result obtained by the mutual authentication.

6. The information processing apparatus according to claim 5, wherein the mutual authentications are based on public-key cryptography, and a cryptographic key of the public-key cryptography is managed based on a public key infrastructure.

7. An information processing method for an information processing apparatus that is carried by a user and that performs communication via the body of the user as a communication medium with a sensor that senses biometric information of the user, comprising the steps of:

performing mutual authentication with the sensor by performing communication via the body of the user as the communication medium, wherein performing mutual authentication comprises:

sending to the sensor a certificate of the information processing apparatus for verification;

receiving a certificate of the sensor;

verifying the validity of the certificate of the sensor;

sending a first challenge to the sensor, in response to verifying that the certificate of the sensor is valid;

receiving a first response and a first key generation information from the sensor;

authenticating the sensor based on the received response;

sending a first authentication result to the sensor;

receiving a second challenge from the sensor;

generating a second response and a second key generation information;

sending the generated second response and the second key generation information to the sensor for verification; and receiving a second authentication result from the sensor; and transmitting an encrypted template that is pre-stored biometric information of the user to the sensor via the body of the user in a case where the sensor is verified as a valid sensor, the template being encrypted using a session key generated based on the first key generation information and the second key generation information.

8. A non-transitory computer-readable medium that allows an information processing apparatus that is carried by a user and that performs communication via the body of the user as a communication medium with a sensor that senses biometric information of the user to perform information processing, the information processing comprising the steps of:

performing mutual authentication with the sensor by performing communication via the body of the user as the communication medium, wherein performing mutual authentication comprises:

sending to the sensor a certificate of the information processing apparatus for verification;

receiving a certificate of the sensor;

verifying the validity of the certificate of the sensor;

sending a first challenge to the sensor, in response to verifying that the certificate of the sensor is valid;

receiving a first response and a first key generation information from the sensor;

authenticating the sensor based on the received response;

sending a first authentication result to the sensor;

receiving a second challenge from the sensor;

generating a second response and a second key generation information;

sending the generated second response and the second key generation information to the sensor for verification; and receiving a second authentication result from the sensor; and transmitting an encrypted template that is pre-stored biometric information of the user to the sensor via the body of the user in a case where the sensor is verified as a valid sensor, the template being encrypted based on the first key generation information and the second key generation information.

9. An information processing apparatus that is carried by a user and that performs communication via the body of the user as a communication medium with a sensor that senses biometric information of the user, comprising:

a processor; and a memory coupled to the processor which stores instructions that, when executed on the processor, cause the apparatus to:

store the biometric information of the user as a template;

perform mutual authentication with the sensor by performing communication via the body of the user as the communication medium, wherein performing mutual authentication comprises;

sending to the sensor a certificate of the information processing apparatus for verification;

receiving a certificate of the sensor;
verifying the validity of the certificate of the sensor;
sending a first challenge to the sensor, in response to verifying that the certificate of the sensor is valid;
receiving a first response and a first key generation information from the sensor;
authenticating the sensor based on the received response;
sending a first authentication result to the sensor;
receiving a second challenge from the sensor;
generating a second response and a second key generation information;
sending the generated second response and the second key generation information to the sensor for verification; and
receiving a second authentication result from the sensor;
determine whether the biometric information of the user transmitted from the sensor via the body of the user matches the template based on information obtained by comparing the biometric information with the template; and
a determination-result transmitting unit that transmits-information indicating a determination result obtained by the determination to the sensor via the body of the user.

10. The information processing apparatus according to claim 9, wherein the mutual authentications are based on public-key cryptography, and a cryptographic key of the public-key cryptography is managed based on a public key infrastructure.

11. An information processing method for an information processing apparatus that is carried by a user and that performs communication via the body of the user as a communication medium with a sensor that senses biometric information of the user, comprising the steps of:
performing mutual authentication with the sensor by performing communication via the body of the user as the communication medium, wherein performing mutual authentication comprises:
sending to the sensor a certificate of the information processing apparatus for verification;
receiving a certificate of the sensor;
verifying the validity of the certificate of the sensor;
sending a first challenge to the sensor, in response to verifying that the certificate of the sensor is valid;
receiving a first response and a first key generation information from the sensor;
authenticating the sensor based on the received response;
sending a first authentication result to the sensor;
receiving a second challenge from the sensor;
generating a second response and a second key generation information;
sending the generated second response and the second key generation information to the sensor for verification; and
receiving a second authentication result from the sensor;
determining whether the biometric information of the user transmitted from the sensor via the body of the user matches a template that is pre-stored biometric information of the user based on information obtained by comparing the biometric information with the template; and
transmitting information indicating a determination result to the sensor via the body of the user.

12. A non-transitory computer-readable medium that allows an information processing apparatus that is carried by a user and that performs communication via the body of the user as a communication medium with a sensor that senses biometric information of the user to perform information processing, the information processing comprising the steps of:
performing mutual authentication with the sensor by performing communication via the body of the user as the communication medium, wherein performing mutual authentication comprises:
sending to the sensor a certificate of the information processing apparatus for verification;
receiving a certificate of the sensor;
verifying the validity of the certificate of the sensor;
sending a first challenge to the sensor, in response to verifying that the certificate of the sensor is valid;
receiving a first response and a first key generation information from the sensor;
authenticating the sensor based on the received response;
sending a first authentication result to the sensor;
receiving a second challenge from the sensor;
generating a second response and a second key generation information;
sending the generated second response and the second key generation information to the sensor for verification; and
receiving a second authentication result from the sensor;
determining whether the biometric information of the user transmitted from the sensor via the body of the user matches a template that is pre-stored biometric information of the user based on information obtained by comparing the biometric information with the template; and
transmitting information indicating a determination result to the sensor via the body of the user.

13. An information processing apparatus for performing communication with a mobile device that is carried by a user and that stores in advance biometric information of the user as an encrypted template via the body of the user as a communication medium, comprising:
a processor; and
a memory coupled to the processor which stores instructions that, when executed on the processor, cause the apparatus to:
perform mutual authentication with the mobile device by performing communication via the body of the user as the communication medium, wherein performing mutual authentication comprises:
receiving a certificate of the mobile device from the mobile device;
verifying the certificate of the mobile device;
sending to the mobile device a certificate of the sensor in response to verifying that the certificate of the mobile device is valid;
receiving a first challenge from the mobile device, in response to verifying that the certificate of the sensor is valid;
generating a first response and a first key generation information;
sending the first response and the first key generation information to the mobile device;
receiving a first authentication result from the mobile device;
sending a second challenge to the mobile device;
receiving a second response and a second key generation information from the mobile device;
verifying the second response; and
sending a second authentication result to the sensor;

receiving a template from the mobile device, wherein the template is encrypted a session key generated based on the first key generation information and the second key generation information;

sense the biometric information of the user;

determine whether the sensed biometric information of the user matches the encrypted template transmitted from the mobile device via the body of the user based on information obtained by comparing the biometric information with the encrypted template, the encrypted template being encrypted using a session key generated based on the first key generation information and the second key generation information; and output a preset control signal in a case where the sensed biometric information of the user matches the encrypted template transmitted from the mobile device.

14. The information processing apparatus according to claim 13, wherein the mutual authentications are based on public-key cryptography, and a cryptographic key of the public-key cryptography is managed based on a public key infrastructure.

15. An information processing method for an information processing apparatus for performing communication with a mobile device that is carried by a user and that stores in advance biometric information of the user as a template via the body of the user as a communication medium, comprising the steps of:

performing mutual authentication with the mobile device by performing communication via the body of the user as the communication medium, wherein performing mutual authentication comprises:

receiving a certificate of the mobile device from the mobile device;

verifying the certificate of the mobile device;

sending to the mobile device a certificate of the sensor in response to verifying that the certificate of the mobile device is valid;

receiving a first challenge from the mobile device, in response to verifying that the certificate of the sensor is valid;

generating a first response and a first key generation information;

sending the first response and the first key generation information to the mobile device;

receiving a first authentication result from the mobile device;

sending a second challenge to the mobile device;

receiving a second response and a second key generation information from the mobile device;

verifying the second response; and sending a second authentication result to the sensor;

receiving a template from the mobile device, wherein the template is encrypted a session key generated based on the first key generation information and the second key generation information;

sensing the biometric information of the user;

determining whether the sensed biometric information of the user matches the template transmitted from the mobile device via the body of the user based on information obtained by comparing the biometric information with the template; and outputting a preset control signal in a case where the mobile device is verified as a valid mobile device based on a mutual authentication result and in a case where it is determined that the biometric information and the template match each other.

16. A non-transitory computer-readable medium that allows an information processing apparatus for performing communication with a mobile device that is carried by a user and that stores in advance biometric information of the user as a template via the body of the user as a communication medium to perform information processing, the information processing comprising the steps of:

performing mutual authentication with the mobile device by performing communication via the body of the user as the communication medium, wherein performing mutual authentication comprises:

receiving a certificate of the mobile device from the mobile device;

verifying the certificate of the mobile device;

sending to the mobile device a certificate of the sensor in response to verifying that the certificate of the mobile device is valid;

receiving a first challenge from the mobile device, in response to verifying that the certificate of the sensor is valid;

generating a first response and a first key generation information;

sending the first response and the first key generation information to the mobile device;

receiving a first authentication result from the mobile device;

sending a second challenge to the mobile device;

receiving a second response and a second key generation information from the mobile device;

verifying the second response; and sending a second authentication result to the sensor;

receiving a template from the mobile device, wherein the template is encrypted a session key generated based on the first key generation information and the second key generation information;

sensing the biometric information of the user;

determining whether the sensed biometric information of the user matches the template transmitted from the mobile device via the body of the user based on information obtained by comparing the biometric information with the template, the template being encrypted using a session key generated based on the first key generation information and the second key generation information; and outputting a preset control signal in a case where the mobile device is verified as a valid mobile device based on a mutual authentication result and in a case where it is determined that the biometric information and the template match each other.

17. An information processing apparatus for performing communication with a mobile device that is carried by a user and that stores in advance biometric information of the user as a template via the body of the user as a communication medium, comprising:

a processor; and a memory coupled to the processor which stores instructions that, when executed on the processor, cause the apparatus to:

perform mutual authentication with the mobile device by performing communication via the body of the user as the communication medium, wherein performing mutual authentication comprises:

receiving a certificate of the mobile device from the mobile device;

verifying the certificate of the mobile device;
sending to the mobile device a certificate of the sensor in response to verifying that the certificate of the mobile device is valid;
receiving a first challenge from the mobile device, in response to verifying that the certificate of the sensor is valid;
generating a first response and a first key generation information;
sending the first response and the first key generation information to the mobile device;
receiving a first authentication result from the mobile device;
sending a second challenge to the mobile device;
receiving a second response and a second key generation information from the mobile device;
verifying the second response; and
sending a second authentication result to the sensor;
receiving a template from the mobile device, wherein the template is encrypted a session key generated based on the first key generation information and the second key generation information;
sense the biometric information of the user;
transmit the sensed biometric information of the user via the body of the user; and
output a preset control signal in a case where the mobile device is verified as a valid mobile device based on a mutual authentication result obtained by the mutual authentication and in a case where the mobile device, which has received the transmitted biometric information of the user, receives via the body of the user information indicating a determination result that the biometric information and the template are determined to match each other, the template being encrypted using a session key generated based on the first key generation information and the second key generation information.

18. The information processing apparatus according to claim 17, wherein the mutual authentications are based on public-key cryptography, and a cryptographic key of the public-key cryptography is managed based on a public key infrastructure.

19. An information processing method for an information processing apparatus for performing communication with a mobile device that is carried by a user and that stores in advance biometric information of the user as a template via the body of the user as a communication medium, comprising the steps of:
performing mutual authentication with the mobile device by performing communication via the body of the user as the communication medium, wherein performing mutual authentication comprises:
receiving a certificate of the mobile device from the mobile device;
verifying the certificate of the mobile device;
sending to the mobile device a certificate of the sensor in response to verifying that the certificate of the mobile device is valid;
receiving a first challenge from the mobile device, in response to verifying that the certificate of the sensor is valid;
generating a first response and a first key generation information;
sending the first response and the first key generation information to the mobile device;
receiving a first authentication result from the mobile device;
sending a second challenge to the mobile device;
receiving a second response and a second key generation information from the mobile device;
verifying the second response; and
sending a second authentication result to the sensor;
receiving a template from the mobile device, wherein the template is encrypted a session key generated based on the first key generation information and the second key generation information;
sensing the biometric information of the user and transmitting the sensed biometric information of the user via the body of the user; and
outputting a preset control signal in a case where the mobile device is verified as a valid mobile device based on a mutual authentication result and in a case where the mobile device, which has received the transmitted biometric information of the user, receives via the body of the user information indicating a determination result that the biometric information and the template are determined to match each other, the template being encrypted using a session key generated based on the first key generation information and the second key generation information.

20. A non-transitory computer-readable medium that allows an information processing apparatus for performing communication with a mobile device that is carried by a user and that stores in advance biometric information of the user as a template via the body of the user as a communication medium to perform information processing, the information processing comprising the steps of:
performing mutual authentication with the mobile device by performing communication via the body of the user as the communication medium, wherein performing mutual authentication comprises:
receiving a certificate of the mobile device from the mobile device;
verifying the certificate of the mobile device;
sending to the mobile device a certificate of the sensor in response to verifying that the certificate of the mobile device is valid;
receiving a first challenge from the mobile device, in response to verifying that the certificate of the sensor is valid;
generating a first response and a first key generation information;
sending the first response and the first key generation information to the mobile device;
receiving a first authentication result from the mobile device;
sending a second challenge to the mobile device;
receiving a second response and a second key generation information from the mobile device;
verifying the second response; and
sending a second authentication result to the sensor;
receiving a template from the mobile device, wherein the template is encrypted a session key generated based on the first key generation information and the second key generation information;
sensing the biometric information of the user and transmitting the sensed biometric information of the user via the body of the user; and
outputting a preset control signal in a case where the mobile device is verified as a valid mobile device based on a mutual authentication result and in a case where the mobile device, which has received the transmitted biometric information of the user, receives via the body of the user information indicating a determination result that the biometric information and the template are determined to match each other, the template being encrypted using a session key generated based on the first key generation information and the second key generation information.

21. An authentication system comprising:
a mobile device carried by a user; and
a sensor configured to sense biometric information of the user, the mobile device and the sensor communicating with each other via a human body as a communication medium,
wherein the mobile device includes
  a processor; and
  a memory coupled to the processor which stores instructions that, when executed on the processor, cause the mobile device to:
    store the biometric information of the user as a template,
    perform a first mutual authentication with the sensor by performing communication via the body of the user as a communication medium, wherein performing mutual authentication comprises:
      sending to the sensor a certificate of the information processing apparatus for verification;
      receiving a certificate of the sensor;
      verifying the validity of the certificate of the sensor;
      sending a first challenge to the sensor, in response to verifying that the certificate of the sensor is valid;
      receiving a first response and a first key generation information from the sensor;
      authenticating the sensor based on the received response;
      sending a first authentication result to the sensor;
      receiving a second challenge from the sensor;
      generating a second response and a second key generation information;
      sending the generated second response and the second key generation information to the sensor for verification; and
      receiving a second authentication result from the sensor;
    transmit an encrypted template to the sensor via the body of the user in a case where the sensor is verified as a valid sensor, the template being encrypted using a session key generated based on the first key generation information and the second key generation information, and
wherein the sensor includes
  a sensor processor; and
  a sensor memory coupled to the sensor processor which stores instructions that, when executed on the sensor processor, cause the sensor to:
    perform a second mutual authentication with the mobile device by performing communication via the body of the user as the communication medium, wherein the second mutual authentication with the mobile device is performed by:
      receiving a certificate of the mobile device from the mobile device;
      verifying the certificate of the mobile device;
      sending to the mobile device a certificate of the sensor in response to verifying that the certificate of the mobile device is valid;
      receiving a first challenge from the mobile device, in response to verifying that the certificate of the sensor is valid;
      generating a first response and a first key generation information;
      sending the first response and the first key generation information to the mobile device;
      receiving a first authentication result from the mobile device;
      sending a second challenge to the mobile device;
      receiving a second response and a second key generation information from the mobile device;
      verifying the second response; and
      sending a second authentication result to the sensor;
    receiving a template from the mobile device, wherein the template is encrypted a session key generated based on the first key generation information and the second key generation information;
    sense the biometric information of the user,
    determine whether the sensed biometric information of the user matches the template transmitted from the mobile device via the body of the user based on information obtained by comparing the biometric information with the template, and
    output a preset control signal in a case where the mobile device is verified as a valid mobile device based on a mutual authentication result obtained by the second mutual authentication and in a case where the biometric information and the template match each other.

22. An information processing apparatus that is carried by a user and that performs communication via the body of the user as a communication medium with a sensor that senses biometric information of the user, comprising:
a processor; and
a memory coupled to the processor which stores instructions that, when executed on the processor, cause the apparatus to:
  store the biometric information of the user as a template;
  perform mutual authentication with the sensor by performing communication via the body of the user as the communication medium, wherein performing mutual authentication comprises:
    sending to the sensor a certificate of the information processing apparatus for verification;
    receiving a certificate of the sensor;
    verifying the validity of the certificate of the sensor;
    sending a first challenge to the sensor, in response to verifying that the certificate of the sensor is valid;
    receiving a first response and a first key generation information from the sensor;
    authenticating the sensor based on the received response;
    sending a first authentication result to the sensor;
    receiving a second challenge from the sensor;
    generating a second response and a second key generation information;
    sending the generated second response and the second key generation information to the sensor for verification; and
    receiving a second authentication result from the sensor; and
  transmit an encrypted template to the sensor via the body of the user in a case where the sensor is verified as a valid sensor, the template being encrypted using a session key generated based on the first key generation information.

23. An information processing apparatus that is carried by a user and that performs communication via the body of the user as a communication medium with a sensor that senses biometric information of the user, comprising:
  a processor; and
  a memory coupled to the processor which stores instructions that, when executed on the processor, cause the apparatus to:
    store the biometric information of the user as a template;
    perform mutual authentication with the sensor by performing communication via the body of the user as the communication medium, wherein performing mutual authentication comprises:
      sending to the sensor a certificate of the information processing apparatus for verification;
      receiving a certificate of the sensor;
      verifying the validity of the certificate of the sensor;
      sending a first challenge to the sensor, in response to verifying that the certificate of the sensor is valid;
      receiving a first response and a first key generation information from the sensor;
      authenticating the sensor based on the received response;
      sending a first authentication result to the sensor;
      receiving a second challenge from the sensor;
      generating a second response and a second key generation information;
      sending the generated second response and the second key generation information to the sensor for verification; and
      receiving a second authentication result from the sensor;
    determine whether the biometric information of the user transmitted from the sensor via the body of the user matches the template based on information obtained by comparing the biometric information with the template, the template being encrypted using a session key generated based on the first key generation information and the second key generation information; and
    transmit information indicating a determination result obtained by the determining of the match to the sensor via the body of the user.

24. An information processing apparatus for performing communication with a mobile device that is carried by a user and that stores in advance biometric information of the user as a template via the body of the user as a communication medium, comprising:
  a processor; and
  a memory coupled to the processor which stores instructions that, when executed on the processor, cause the apparatus to:
    perform mutual authentication with the mobile device by performing communication via the body of the user as the communication medium, wherein performing mutual authentication comprises:
      receiving a certificate of the mobile device from the mobile device;
      verifying the certificate of the mobile device;
      sending to the mobile device a certificate of the sensor in response to verifying that the certificate of the mobile device is valid;
      receiving a first challenge from the mobile device, in response to verifying that the certificate of the sensor is valid;
      generating a first response and a first key generation information;
      sending the first response and the first key generation information to the mobile device;
      receiving a first authentication result from the mobile device;
      sending a second challenge to the mobile device;
      receiving a second response and a second key generation information from the mobile device;
      verifying the second response; and
      sending a second authentication result to the sensor;
    receiving a template from the mobile device, wherein the template is encrypted a session key generated based on the first key generation information and the second key generation information;
    sense the biometric information of the user;
    determine whether the sensed biometric information of the user matches the template transmitted from the mobile device via the body of the user based on information obtained by comparing the biometric information with the template, the template being encrypted using a session key generated based on the first key generation information and the second key generation information; and
    output a preset control signal in a case where the mobile device is verified as a valid mobile device based on a mutual authentication result obtained by the mutual authentication and in a case where the biometric information and the template match each other.

25. An information processing apparatus for performing communication with a mobile device that is carried by a user and that stores in advance biometric information of the user as a template via the body of the user as a communication medium, comprising:
  a processor; and
  a memory coupled to the processor which stores instructions that, when executed on the processor, cause the apparatus to:
    perform mutual authentication with the mobile device by performing communication via the body of the user as the communication medium, wherein performing mutual authentication comprises:
      receiving a certificate of the mobile device from the mobile device;
      verifying the certificate of the mobile device;
      sending to the mobile device a certificate of the sensor in response to verifying that the certificate of the mobile device is valid;
      receiving a first challenge from the mobile device, in response to verifying that the certificate of the sensor is valid;
      generating a first response and a first key generation information;
      sending the first response and the first key generation information to the mobile device;
      receiving a first authentication result from the mobile device;
      sending a second challenge to the mobile device;
      receiving a second response and a second key generation information from the mobile device;
      verifying the second response; and
      sending a second authentication result to the sensor;
    receiving a template from the mobile device, wherein the template is encrypted a session key generated based on the first key generation information and the second key generation information;
    sense the biometric information of the user;
    transmit the sensed biometric information of the user via the body of the user; and
    output a preset control signal in a case where the mobile device is verified as a valid mobile device based on a mutual authentication result obtained by the mutual authentication and in a case where the mobile device, which has received the transmitted biometric information of the user, receives via the body of the user information indicating a determination result that the biometric information and the template are determined to match each other, the template being encrypted using a session key generated based on the first key generation information and the second key generation information.

* * * * *